US012719763B2

(12) United States Patent
Li et al.

(10) Patent No.: US 12,719,763 B2
(45) Date of Patent: Aug. 25, 2026

(54) MACHINE LEARNING FOR BEAM PREDICTION

(71) Applicant: QUALCOMM Incorporated, San Diego, CA (US)

(72) Inventors: Qiaoyu Li, Beijing (CN); Mahmoud Taherzadeh Boroujeni, San Diego, CA (US); Tao Luo, San Diego, CA (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 18/844,369

(22) PCT Filed: May 6, 2022

(86) PCT No.: PCT/CN2022/091166

§ 371 (c)(1),
(2) Date: Sep. 5, 2024

(87) PCT Pub. No.: WO2023/212916

PCT Pub. Date: Nov. 9, 2023

(65) Prior Publication Data

US 2025/0193087 A1 Jun. 12, 2025

(51) Int. Cl.

*H04L 41/16* (2022.01)
*H04B 7/06* (2006.01)
*H04B 17/318* (2015.01)

(52) U.S. Cl.

CPC .......... *H04L 41/16* (2013.01); *H04B 7/0626* (2013.01); *H04B 17/328* (2023.05)

(58) Field of Classification Search

None

See application file for complete search history.

(56) References Cited

U.S. PATENT DOCUMENTS

2022/0038349 A1* 2/2022 Li .......................... G06N 3/045

FOREIGN PATENT DOCUMENTS

| | | | |
|---|---|---|---|
| WO | 2019004885 A1 | 1/2019 | |
| WO | WO-2019029802 A1 * | 2/2019 | ............. H04L 41/16 |
| WO | 2020213964 A1 | 10/2020 | |
| WO | 2020214168 A1 | 10/2020 | |
| WO | 2021055510 A1 | 3/2021 | |

OTHER PUBLICATIONS

International Search Report and Written Opinion—PCT/CN2022/091166—ISA/EPO—Nov. 28, 2022.

ZTE: "Enhancements on Predictable Mobility for Beam Management", 3GPP TSG RAN WG Meeting #90-e, RP-202675, e-Meeting, Dec. 7-11, 2020, 7 Pages, The Whole Document.

* cited by examiner

*Primary Examiner* — Cai Y Chen

(74) *Attorney, Agent, or Firm* — Loza & Loza, LLP

(57) ABSTRACT

Various aspects of the present disclosure generally relate to wireless communication. In some aspects, a user equipment (UE) may receive a configuration for a machine learning model that includes associations between one or more channel measurements and at least one of machine learning model inputs, machine learning model outputs, and machine learning model labels for at least two serving cells. The UE may initiate a beam prediction for the at least two serving cells based at least in part on the machine learning model. Other aspects, embodiments, and features are also included.

17 Claims, 14 Drawing Sheets

MACHINE LEARNING FOR BEAM PREDICTION

CROSS-REFERENCE TO RELATED APPLICATION(S)

This application is the U.S. national stage of PCT patent application number PCT/CN2022/091166 filed on May 6, 2022.

FIELD OF THE DISCLOSURE

The technology discussed below relates generally to wireless communication systems, and more particularly, to techniques and apparatuses for reference signal index and machine learning for beam prediction.

INTRODUCTION

Wireless communication systems are widely deployed to provide various telecommunication services such as telephony, video, data, messaging, and broadcasts. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. In a 5G network, a user equipment can transmit a sounding reference signal (SRS) using beam sweeping (SRS beam sweeping). A network entity can determine the channel quality based on the SRS beam sweeping and indicate to a user equipment an uplink precoding scheme for a future UL transmission. An exemplary precoding scheme can include one or more of an SRS resource indicator (SRI), a transmit precoder matrix indicator (TPMI), a transmit rank indicator (TRI), and a modulation and coding scheme (MCS).

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various examples and implementations of the present disclosure facilitate beam management. In at least one aspect of the present disclosure, wireless communication devices are provided. In at least one example, wireless communication device may include a transceiver, a memory, and a processing circuit coupled to the transceiver and the memory. The processing circuit may be configured to receive a configuration for a machine learning model that includes associations between one or more channel measurements and at least one of machine learning model inputs, machine learning model outputs, and machine learning model labels for at least two serving cells; and initiate a beam prediction for the at least two serving cells based at least in part on the machine learning model.

Further aspects provide methods of wireless communication and/or wireless communication devices including means to perform such methods. One or more examples of such methods may include receiving a configuration for a machine learning model that includes associations between one or more channel measurements and at least one of machine learning model inputs, machine learning model outputs, and machine learning model labels for at least two serving cells; and initiating a beam prediction for the at least two serving cells based at least in part on the machine learning model.

Still further aspects of the present disclosure include computer-readable storage mediums storing processor-executable programming. In at least one example, the processor-executable programming may be adapted to cause a processing circuit to receive a configuration for a machine learning model that includes associations between one or more channel measurements and at least one of machine learning model inputs, machine learning model outputs, and machine learning model labels for at least two serving cells; and initiate a beam prediction for the at least two serving cells based at least in part on the machine learning model.

These and other aspects of the disclosure will become more fully understood upon a review of the detailed description, which follows. Other aspects, features, and examples of the present invention will become apparent to those of ordinary skill in the art, upon reviewing the following description of specific, exemplary examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples of the invention discussed herein. In similar fashion, while exemplary examples may be discussed below as device, system, or method examples it should be understood that such exemplary examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
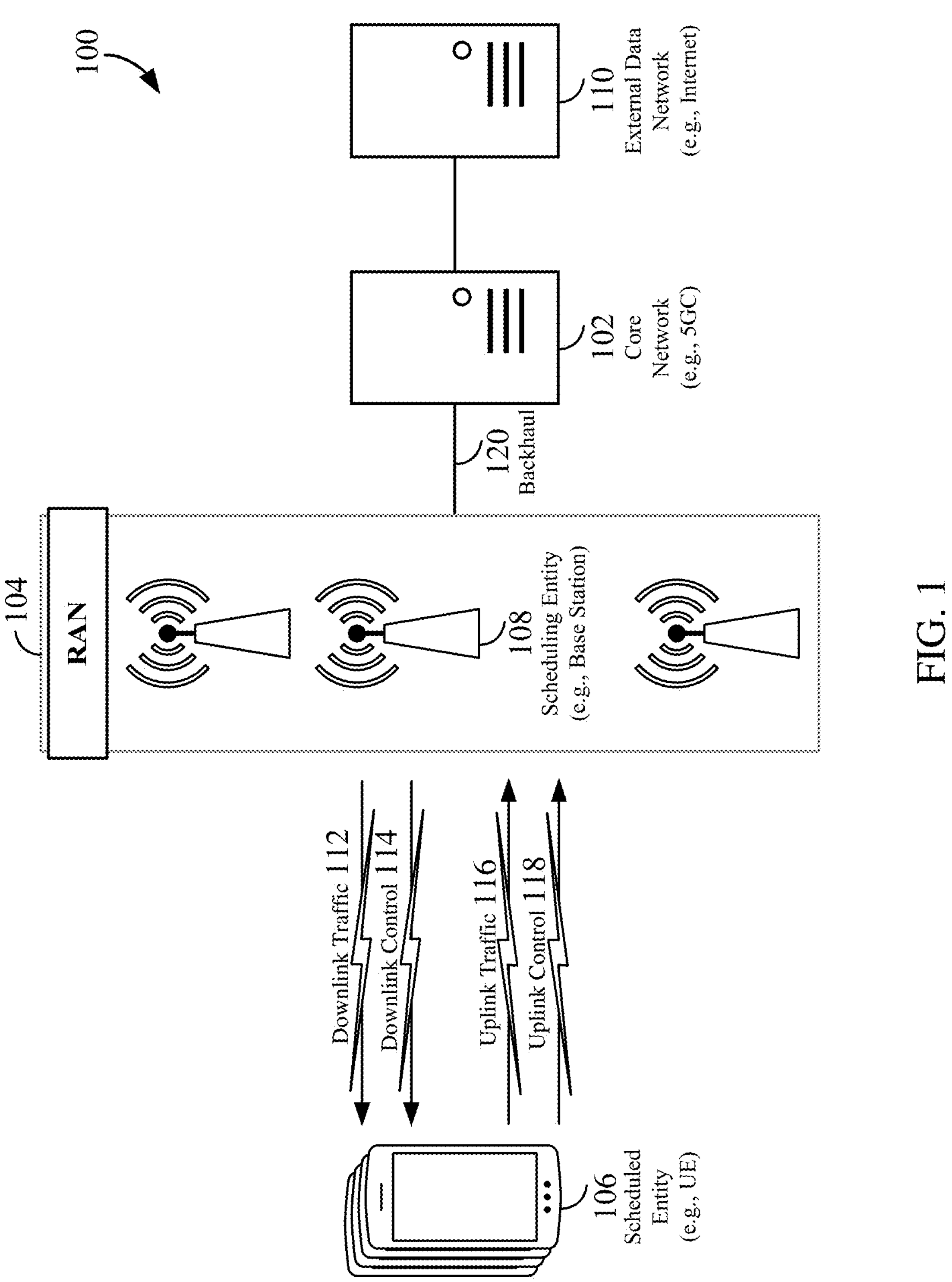
FIG. 1 is a schematic diagram illustrating an example of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, vehicles, aircraft, and ships, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a network entity (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a network entity (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
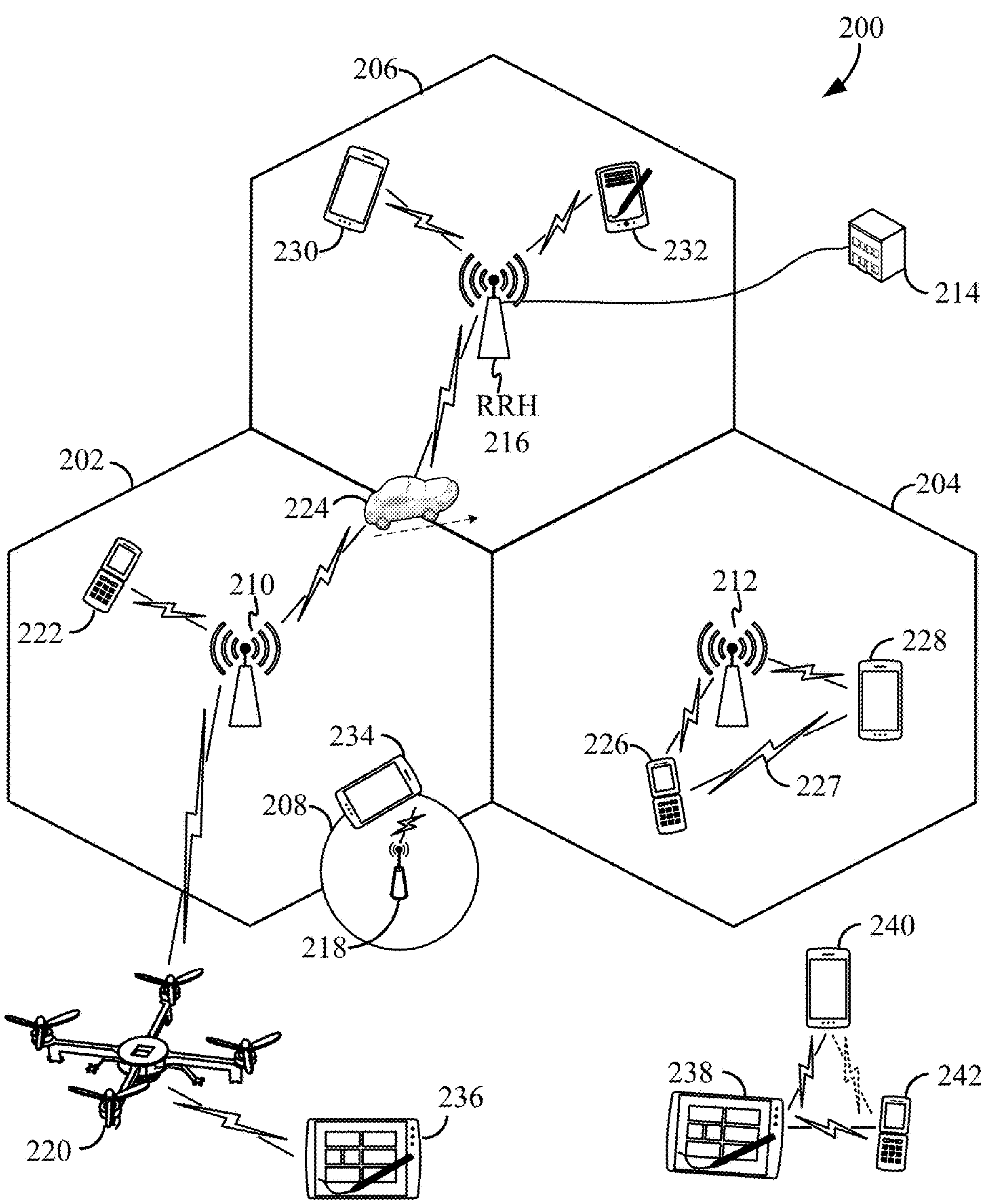
FIG. 2 is a conceptual diagram illustrating an example of a radio access network (RAN) according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204. A third base station 214 is shown controlling a remote radio head (RRH) 216 in cell 206. That is, a base station can have an integrated antenna or can be connected to an antenna or RRH 216 by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell, (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, UE 234 may be in communication with base station 218, and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1.

In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

Figure 3:
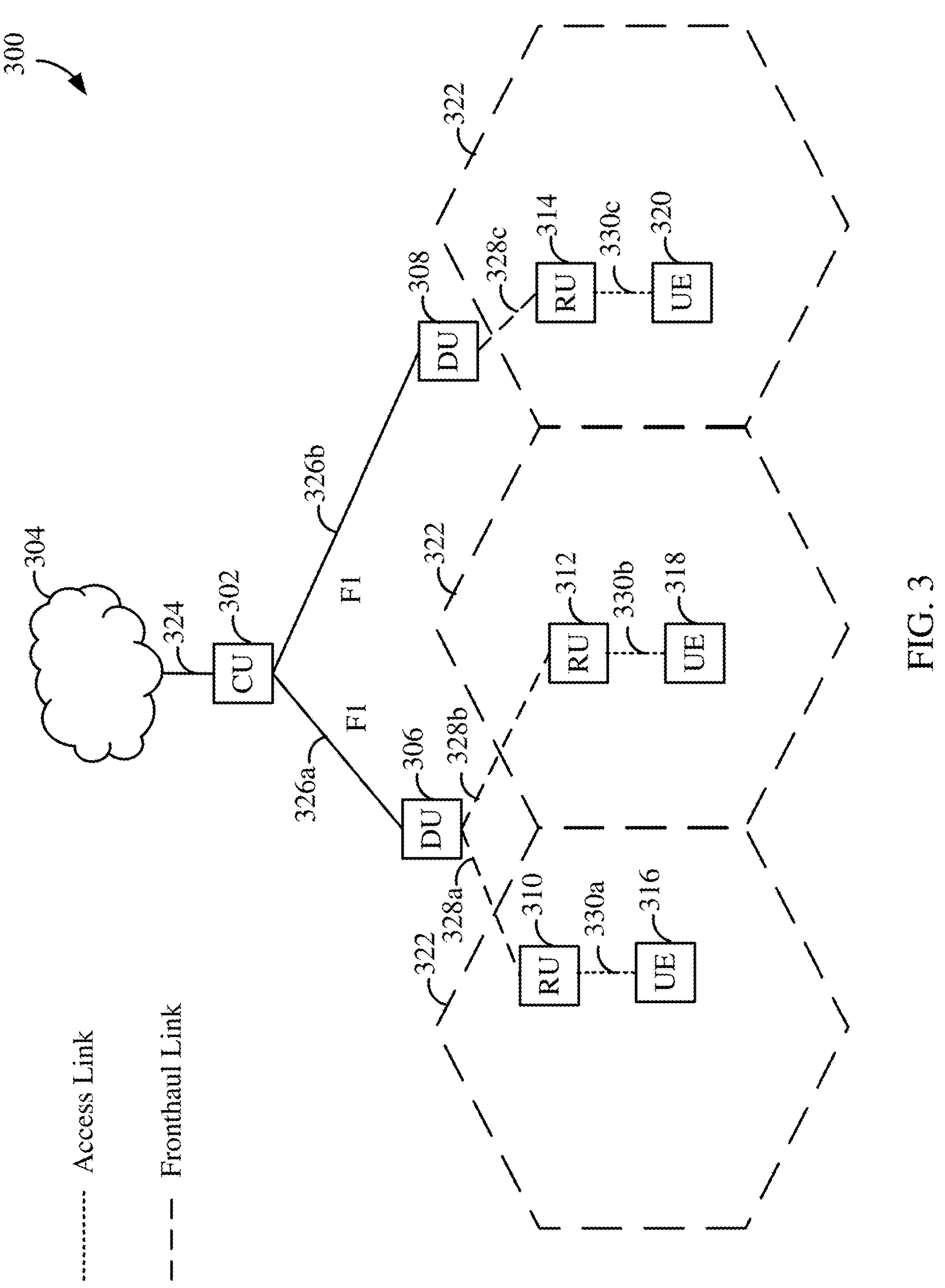
FIG. 3 is a conceptual diagram illustrating an example of a RAN including distributed entities according to some aspects.

FIG. 3 is a diagram illustrating an example of a RAN 300 including distributed entities according to some aspects. The RAN 300 may be similar to the radio access network 200 shown in FIG. 2, in that the RAN 300 may be divided into a number of cells (e.g., cells 322) each of which may be served by respective network entities (e.g., control units, distributed units, and radio units). The network entities may constitute access points, TRPs, base stations (BSs), eNBs, gNBs, or other nodes that utilize wireless spectrum (e.g., the radio frequency (RF) spectrum) and/or other communication links to support access for one or more UEs located within the cells. In some examples, some or all of the network entities of FIG. 3 may be implemented within an integrated access backhaul (IAB) network. In some examples, some or all of the nodes of FIG. 3 may be implemented according to an open-radio access network (O-RAN) architecture.

In the example of FIG. 3, a control unit (CU) 302 communicates with a core network 304 via a backhaul link 324, and communicates with a first distributed unit (DU) 306 and a second distributed unit 308 via respective midhaul links **326*a* and 326*b*. The first distributed unit 306 communicates with a first radio unit (RU) 310 and a second radio unit 312 via respective fronthaul links 328*a* and 328*b*. The second distributed unit 308 communicates with a third radio unit 314 via a fronthaul link 328*c*. The first radio unit 310 communicates with at least one UE 316 via at least one RF access link 330*a*. The second radio unit 312 communicates with at least one UE 318 via at least one RF access link 330*b*. The third radio unit 314 communicates with at least one UE 320 via at least one RF access link 330*c***.

In some examples, a control unit (e.g., the CU 302) is a logical node that hosts a packet data convergence protocol (PDCP) layer, a radio resource control (RRC) layer, a service data adaptation protocol (SDAP) layer and other control functions. A control unit may also terminate interfaces (e.g., an E1 interface, an E2 interface, etc., not shown in FIG. 3) to core network nodes (e.g., nodes of a core network). In addition, an F1 interface (not shown in FIG. 3) may provide a mechanism to interconnect a CU 302 (e.g., the PDCP layer and higher layers) and a DU (e.g., the radio link control (RLC) layer and lower layers). In some aspects, an F1 interface may provide control plane and user plane functions (e.g., interface management, system information management, UE context management, RRC message transfer, etc.). For example, the F1 interface may support F1-C on the control plane and F1-U on the user plane. F1AP is an application protocol for F1 that defines signaling procedures for F1 in some examples.

In some examples, a DU (e.g., the DU 306 or the DU 308) is a logical node that hosts an RLC layer, a medium access control (MAC) layer, and a high physical (PHY) layer based on a lower layer functional split (LLS). In some aspects, a DU may control the operation of at least one RU. A DU may also terminate interfaces (e.g., F1, E2, etc.) to the CU and/or other network nodes. In some examples, a high PHY layer includes portions of the PHY processing such as forward error correction 1 (FEC 1) encoding and decoding, scrambling, modulation, and demodulation.

In some examples, an RU (e.g., the RU 310, the RU 312, or the RU 314) is a logical node that hosts low PHY layer and radio frequency (RF) processing based on a lower layer functional split. In some examples, a RU may be similar to a 3GPP transmit receive point (TRP) or remote radio head (RRH), while also including the low PHY layer. In some examples, a low PHY layer includes portions of the PHY processing such as fast Fourier transform (FFT), inverse FFT (iFFT), digital beamforming, and physical random access channel (PRACH) extraction and filtering. The RU may also include a radio (e.g., radio frequency (RF)) chain for communicating with one or more UEs.

The functionality splits between the entities of the RAN 300 may be different in different examples. In some examples, Layer 1 functions, Layer 2 functions, and Layer 3 functions may be allocated among the RU, DU, and CU entities. Examples of Layer 1 functions include RF functions and low PHY layer functions. Examples of Layer 2 functions include high PHY layer functions, low MAC layer functions, high MAC layer functions, low RLC layer functions, and high RLC layer functions. Examples of Layer 3 functions include PDCP layer functions and RRC layer functions. Other functionality splits may be used in other examples.

As discussed above, the two Layer 3 functions may be implemented in a CU. The other Layer 1 and Layer 2 functions may thus be split between the RU and the DU in this case. In some examples, the Layer 1 functions are implemented in the RU and the Layer 3 functions are implemented in the DU. In some examples, all PHY functionality is implemented in the RU (i.e., the high PHY layer functions are implemented in the RU and not the DU). Other functionality splits may be used in other examples.

Different splits may be used between low layer functionality and high layer functionality in different examples. For example, the split between the low PHY layer functionality and the high PHY layer functionality may be defined between RE mapping and precoding in some cases. Thus, the RE mapping may be designated as a low PHY layer function performed by an RU and the precoding may be designated as a high PHY layer function performed by a DU in such a case. Other functionality splits may be used in other examples.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408.

Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
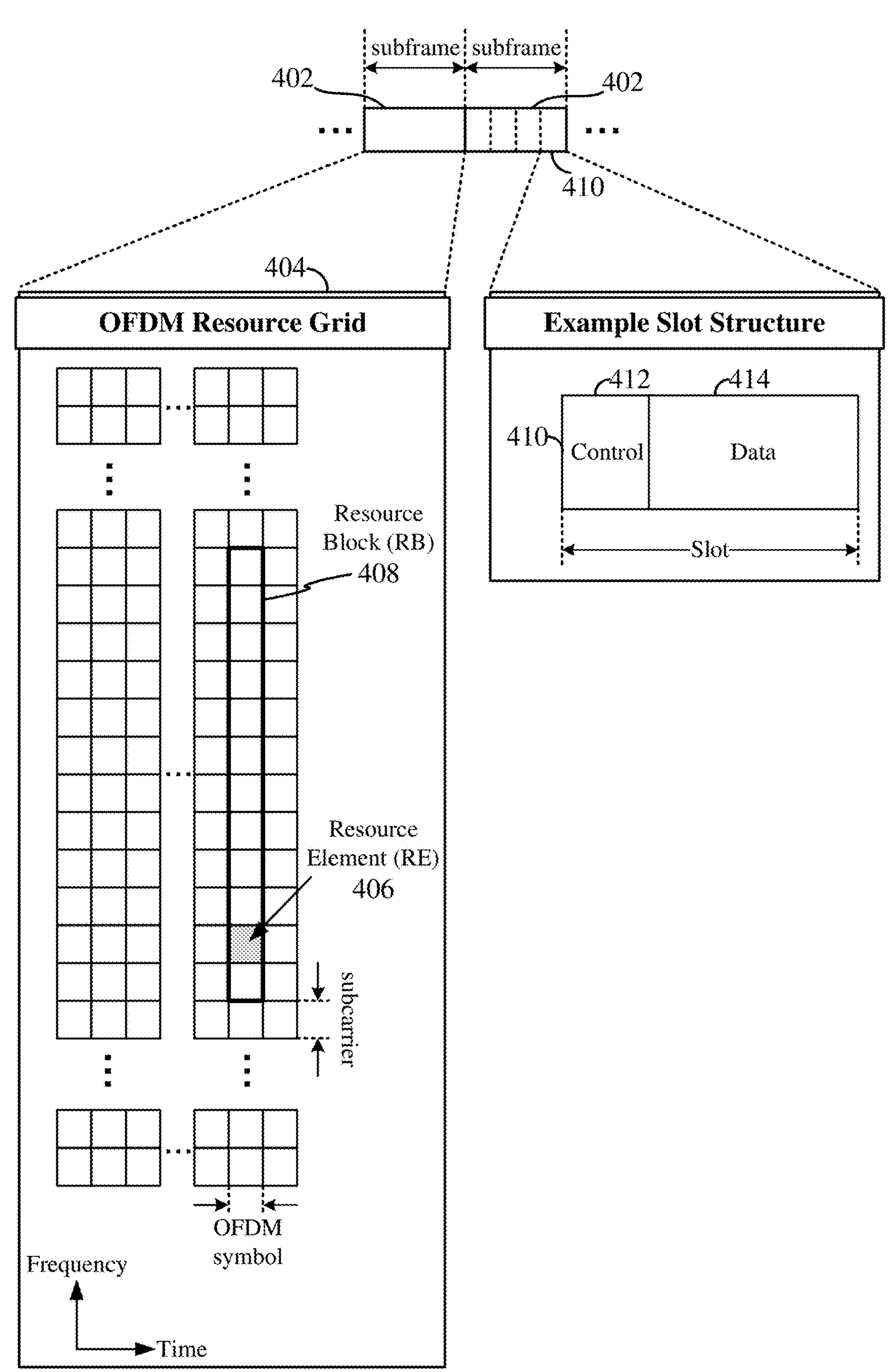
FIG. 4 is a schematic diagram illustrating organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions U such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESETO), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

Figure 5:
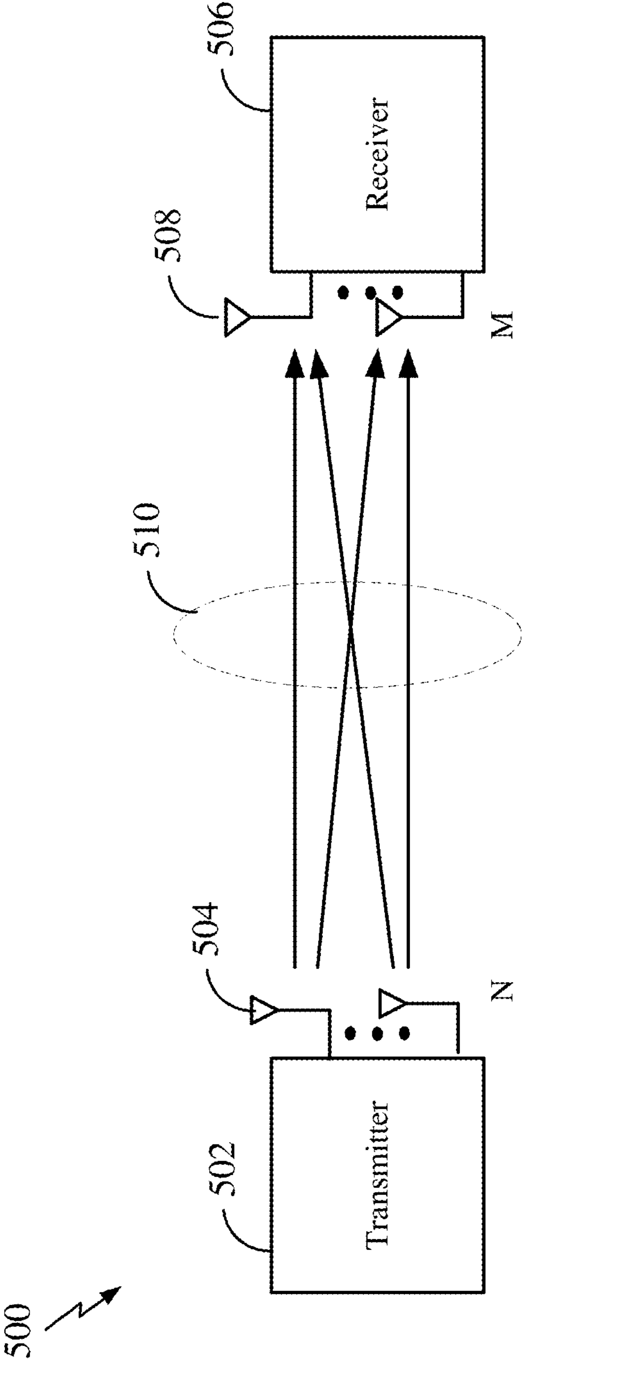
FIG. 5 is a schematic diagram illustrating an example of a wireless communication system supporting MIMO.

In some aspects of the disclosure, the scheduling entity and/or scheduled entity may be configured for beamforming and/or multiple-input multiple-output (MIMO) technology. FIG. 5 illustrates an example of a wireless communication system 500 supporting MIMO. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. Each of the transmitter 502 and the receiver 506 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 500 is limited by the number of transmit or receive antennas 504 or 508, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 5, a rank-2 spatial multiplexing transmission on a 2×2 MIMO antenna configuration will transmit one data stream from each transmit antenna 504. Each data stream reaches each receive antenna 508 along a different signal path 510. The receiver 506 may then reconstruct the data streams using the received signals from each receive antenna 508.

Beamforming is a signal processing technique that may be used at the transmitter 502 or receiver 506 to shape or steer an antenna beam (e.g., a transmit beam or receive beam) along a spatial path between the transmitter 502 and the receiver 506. Beamforming may be achieved by combining the signals communicated via antennas 504 or 508 (e.g., antenna elements of an antenna array module) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In 5G NR systems, particularly for FR2 (e.g., millimeter wave) systems, beamformed signals may be utilized for most downlink channels, including the PDCCH and PDSCH. In addition, broadcast control information, such as the SSB, slot format indicator (SFI), and paging information, may be transmitted in a beam-sweeping manner to enable all scheduled entities (e.g., UEs) in the coverage area of a network entity (e.g., base station, gNB, TRP) to receive the broadcast control information. In addition, for UEs configured with beamforming antenna arrays, beamformed signals may also be utilized for uplink channels, including the PUCCH and PUSCH.

Figure 6:
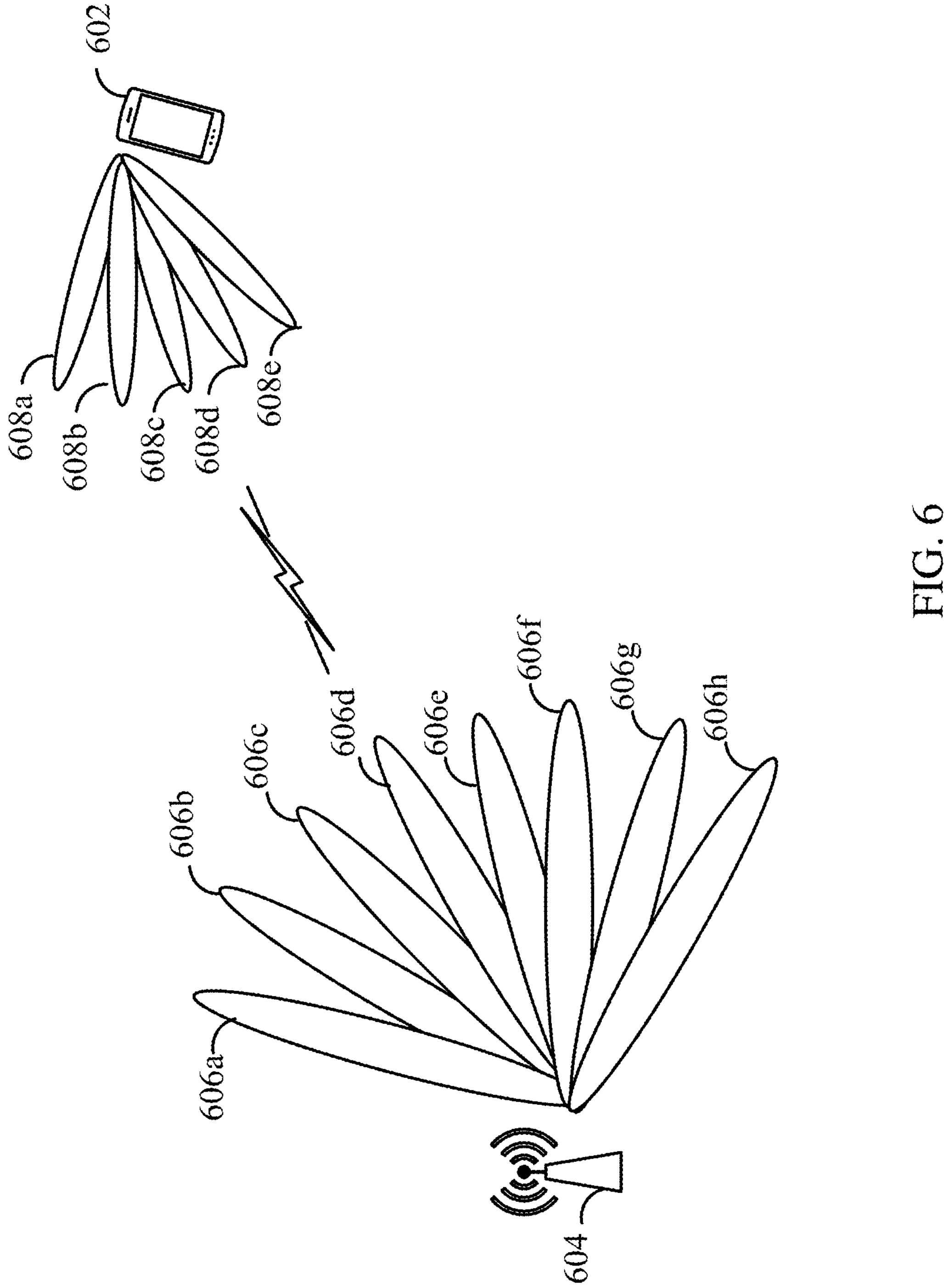
FIG. 6 is a schematic diagram illustrating communication between a network entity and a UE using beamformed signals according to some aspects.

FIG. 6 is a diagram illustrating communication between a network entity 604 and a UE 602 using beamformed signals according to some aspects. The network entity 604 may be any of the base stations (e.g., gNB, CU, DU) or scheduling entities illustrated in FIGS. 1 and/or 2, and the UE 602 may be any of the UEs or scheduled entities illustrated in FIGS. 1 and/or 2.

The network entity 604 may generally be capable of communicating with the UE 602 using one or more transmit beams, and the UE 602 may further be capable of communicating with the network entity 604 using one or more receive beams. As used herein, the term transmit beam refers to a beam on the network entity 604 that may be utilized for downlink or uplink communication with the UE 602. In addition, the term receive beam refers to a beam on the UE 602 that may be utilized for downlink or uplink communication with the network entity 604.

In the example shown in FIG. 6, the network entity 604 is configured to generate a plurality of transmit beams **606*a*-606*h*, each associated with a different spatial direction. In addition, the UE 602 is configured to generate a plurality of receive beams 608*a*-608*e*, each associated with a different spatial direction. It should be noted that while some beams are illustrated as adjacent to one another, such an arrangement may be different in different aspects. For example, transmit beams 606*a*-606*h* transmitted during a same symbol may not be adjacent to one another. In some examples, the network entity 604 and UE 602 may each transmit more or less beams distributed in all directions (e.g., 360 degrees) and in three-dimensions. In addition, the transmit beams 606*a*-606*h* may include beams of varying beam width. For example, the network entity 604** may transmit certain signals (e.g., SSBs) on wider beams and other signals (e.g., CSI-RSs) on narrower beams.

The following represent various examples of beam management procedures between the UE 602 and the network entity 604. The network entity 604 and UE 602 may select one or more transmit beams **606*a*-606*h* on the network entity 604 and one or more receive beams 608*a*-608*e* on the UE 602 for communication of uplink and downlink signals therebetween using a beam management procedure. In one example, during initial cell acquisition, the UE 602 may perform a P1 beam management procedure to scan the plurality of transmit beams 606*a*-606*h* on the plurality of receive beams 608*a*-608*e* to select a beam pair link (e.g., one of the transmit beams 606*a*-606*h* and one of the receive beams 608*a*-608*e*) for a physical random access channel (PRACH) procedure for initial access to the cell. For example, periodic SSB beam sweeping may be implemented on the network entity 604 at certain intervals (e.g., based on the SSB periodicity). Thus, the network entity 604 may be configured to sweep or transmit an SSB on each of a plurality of wider transmit beams 606*a*-606*h*** during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the network entity 604 and UE 602 may perform a P2 beam management procedure for beam refinement at the network entity 604. For example, the network entity 604 may be configured to sweep or transmit a DL reference signal (e.g., CSI-RS) on each of a plurality of narrower transmit beams (e.g., beams **606*a*-606*h*). Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the network entity), semi-persistently (e.g., as configured via RRC signaling and activated/deactivated via MAC-CE signaling by the network entity), or aperiodically (e.g., as triggered by the network entity via DCI). The UE 602 is configured to scan the plurality of CSI-RS transmit beams 606*a*-606*h* on the plurality of receive beams 608*a*-608*e*. The UE 602 then performs beam measurements (e.g., RSRP, SINR, etc.) of the received CSI-RSs on each of the receive beams 608*a*-608*e* to determine the respective beam quality of each of the CSI-RS transmit beams 606*a*-606*h* as measured on each of the receive beams 608*a*-608*e***.

The UE 602 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams **606*a*-606*h* on one or more of the receive beams 608*a*-608*e* to the network entity 604. The network entity 604 may then select one or more CSI-RS transmit beams on which to communicate downlink and/or uplink control and/or data with the UE 602**. In some examples, the selected CSI-RS transmit beam(s) have the highest RSRP from the L1 measurement report. Transmission of the L1 measurement report may occur periodically (e.g., as configured via RRC signaling by the network entity), semi-persistently (e.g., as configured via RRC signaling and activated/deactivated via MAC-CE signaling by the network entity), or aperiodically (e.g., as triggered by the network entity via DCI).

The UE 602 may further select a corresponding receive beam on the UE 602 for each selected serving CSI-RS transmit beam to form a respective beam pair link (BPL) for each selected serving CSI-RS transmit beam. For example, the UE 602 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the network entity 604 may configure the UE 602 to perform SSB beam measurements and provide an L1 measurement report containing beam measurements of SSB transmit beams 606*a*-606*h*. For example, the network entity 604 may configure the UE 602 to perform SSB beam measurements and/or CSI-RS beam measurements for beam failure detection (BFD), beam failure recovery (BFR), cell reselection, beam tracking (e.g., for a mobile UE 602 and/or network entity 604), or other beam optimization purpose.

In addition, when the channel is reciprocal, the transmit and receive beams may be selected using an uplink beam management scheme. In one example, the UE 602 may be configured to sweep or transmit on each of a plurality of receive beams 608*a*-608*e*. For example, the UE 602 may transmit an SRS on each beam in different beam directions (i.e., SRS beam sweeping). In addition, the network entity 604 may be configured to receive the uplink beam reference signals (e.g., SRS) on a plurality of transmit beams 606*a*-606*h*. The network entity 604 then performs beam measurements (e.g., RSRP, SINR, etc.) of the beam reference signals on each of the transmit beams 606*a*-606*h* to determine the respective beam quality of each of the receive beams 608*a*-608*e* as measured on each of the transmit beams 606*a*-606*h*.

The network entity 604 may then select one or more transmit beams on which to communicate downlink and/or uplink control and/or data with the UE 602. In some examples, the selected transmit beam(s) have the highest RSRP. The UE 602 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 606*d*) on the network entity 604 and a single receive beam (e.g., beam 608*c*) on the UE may form a single BPL used for communication between the network entity 604 and the UE 602. In another example, multiple CSI-RS transmit beams (e.g., beams 606*c*, 606*d*, and 606*e*) on the network entity 604 and a single receive beam (e.g., beam 608*c*) on the UE 602 may form respective BPLs used for communication between the network entity 604 and the UE 602. In another example, multiple CSI-RS transmit beams (e.g., beams 606*c*, 606*d*, and 606*e*) on the network entity 604 and multiple receive beams (e.g., beams 608*c* and 608*d*) on the UE 602 may form multiple BPLs used for communication between the network entity 604 and the UE 602. In this example, a first BPL may include transmit beam 606*c* and receive beam 608*c*, a second BPL may include transmit beam 608*d* and receive beam 608*c*, and a third BPL may include transmit beam 608*e* and receive beam 608*d*.

In addition to L1 measurement reports, the UE 602 can further utilize the beam reference signals to estimate the channel quality of the channel between the network entity 604 and the UE 602. For example, the UE 602 may measure the SINR of each received CSI-RS and generate a CSI report based on the measured SINR. The CSI report may include, for example, a channel quality indicator (CQI), rank indicator (RI), precoding matrix indicator (PMI), and/or layer indicator (LI). The network entity (e.g., gNB) may use the CSI report to select a rank for the UE, along with a precoding matrix and a MCS to use for future downlink transmissions to the UE. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The LI may be utilized to indicate which column of the precoding matrix of the reported PMI corresponds to the strongest layer codeword corresponding to the largest reported wideband CQI.

As described in more detail below, the UE 602 may perform beam prediction, in accordance with an artificial intelligence or machine learning model, based at least in part on one or more reference signal measurements.

Figure 7:
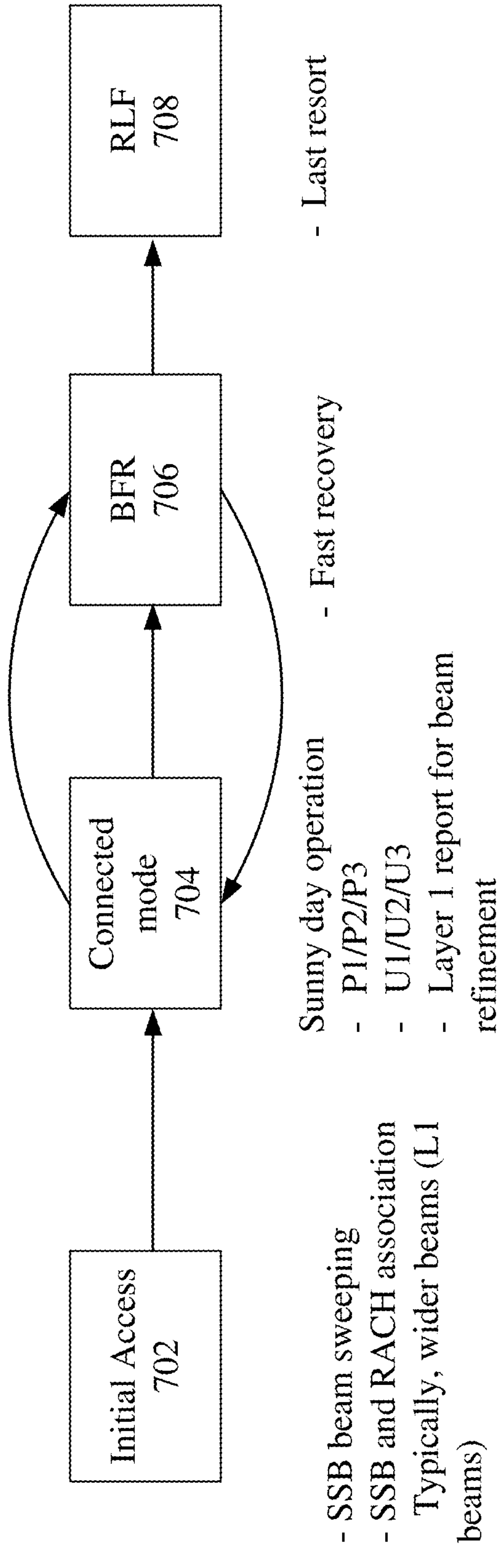
FIG. 7 is a schematic diagram illustrating an example of beam management procedures, in accordance with the present disclosure.

FIG. 7 is a diagram illustrating an example 700 of beam management procedures, in accordance with the present disclosure. As shown in connection with reference number 702, the UE 602 and the network entity 604 may perform an initial access procedure. In some cases, the initial access procedure may include SSB beam switching, or SSB and random access channel (RACH) association (e.g., for wider beams such as L1 beams).

As shown in connection with reference number 704, the UE 602 and the network entity 604 may communicate in accordance with a connected mode. For example, the UE 602 or the network entity 604 may perform beam management such as downlink beam management (e.g., P1/P2/P3) or uplink beam management (e.g., U1/U2/U3). In some cases, the UE 602 may be configured to generate a Layer 1 report for beam refinement.

As shown in connection with reference number 706, the UE 602 may perform beam failure recovery (BFR). In some cases, beam failure may occur due to changing channel conditions, obstacles, distance from the base station transmitting the beam, or interference, among other examples. When a reference signal for a set of beams fails to satisfy a threshold on a particular number of monitoring occasions, the UE 602 may identify a beam failure, and may perform BFR to recover the beam or identify a new beam for communicating with the network entity 604.

As shown in connection with reference number 708, the UE 602 may declare a radio link failure (RLF) based at least in part on the BFR procedure being unsuccessful. In some cases, the UE 602 may declare the RLF after an expiration of a BFR timer (e.g., if the UE 602 has not recovered the beam prior to the expiration of the BFR timer). In some cases, the UE 602 may enter an idle mode, report the RLF, or search for a new cell, among other examples.

In some cases, beam management (BM) (e.g., frequency BM) with SSB-index-RSRP or CSI-RSRP reporting (e.g., every 20 ms or 40 ms) may consume significant overhead or energy resources of the UE 602. In stationary or low-speed scenarios, the beam characteristics for the BM may not change over the course of hundreds of milliseconds. Thus, it may be beneficial to reduce the overhead or power consumption of the UE 602 by performing one or more of the following: 1) predicting whether the beam characteristics may change (or change more dynamically) at a future time (or a future time window), with increased BM periodicity (e.g., hundreds of milliseconds instead of 20 ms) and/or a reduced number of CSI-RS/SSB resources (e.g., using only four measured beams to predict a top beam out of 32 potential beams); and/or 2) sending requests (when necessary) to the network entity 604 for decreased BM periodicity or increased CSI-RS/SSB resources if the beam characteristics are predicted to change (or predicted to change more dynamically).

Figure 8:
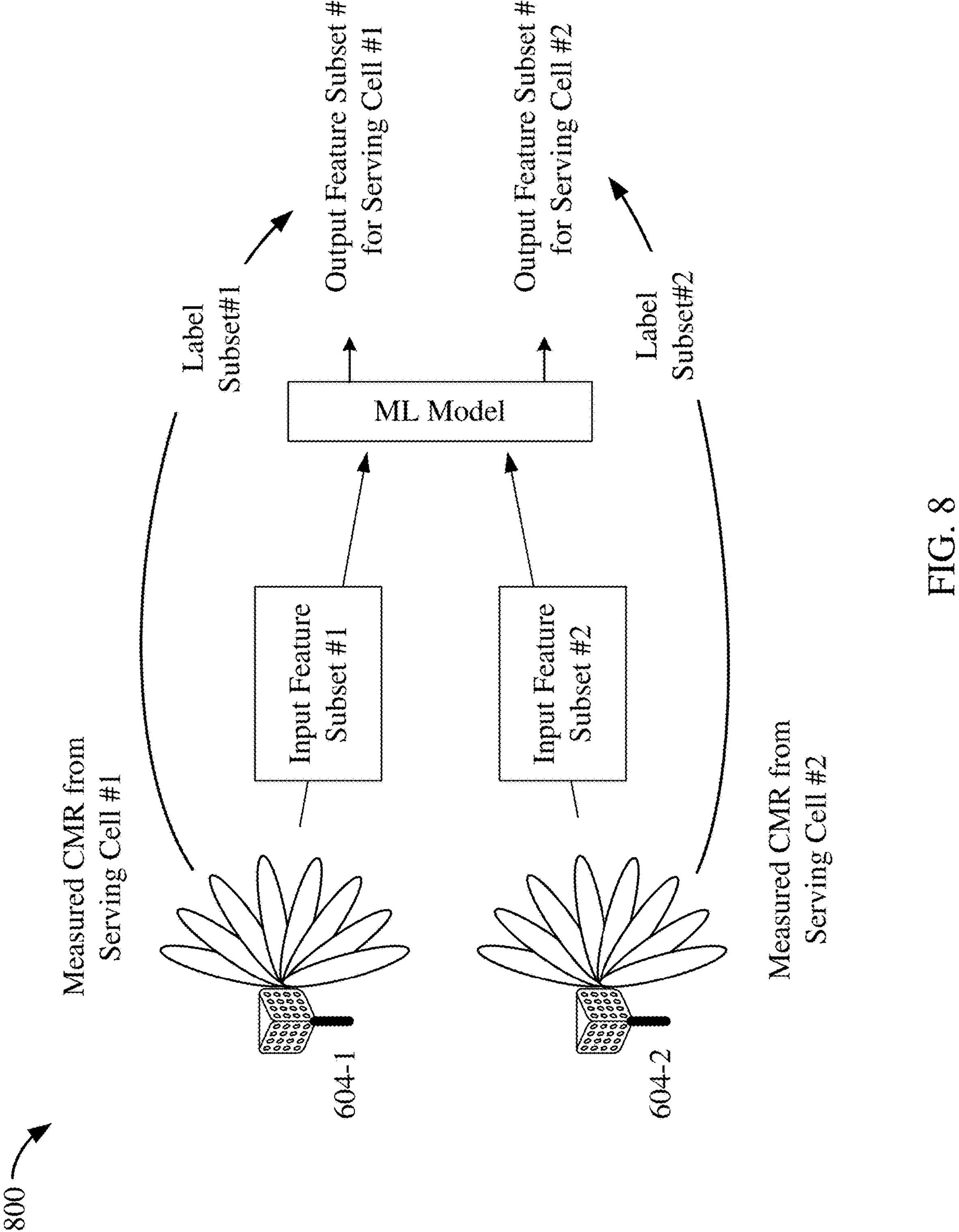
FIG. 8 is a schematic diagram illustrating an example of a generic model for beam prediction, in accordance with the present disclosure.

According to aspects of the present disclosure, a UE may utilize at least one of machine learning model inputs, machine learning model outputs, and/or machine learning model labels to facilitate beam prediction and/or to carry out model training. Referring to FIG. 8, which is a schematic diagram illustrating an example 800 of beam prediction using a machine learning model, in according with the present disclosure. As shown in the example 800, the UE may be operating in an area with a plurality of network entities 604 associated with different serving cells. The UE 602 may be configured to employ the machine learning model with associations between the machine learning model inputs, machine learning model outputs, and machine learning model labels from more than one serving cell.

In at least one example, the machine learning model inputs may include multiple subsets of input features. A first input feature subset may be associated with channel characteristics measured from channel measurement resources associated with a first serving cell (e.g., the first network entity 604-1), and a second input feature subset may be associated with channel characteristics measured from channel measurement resources associated with a second serving cell (e.g., the network second entity 604-2).

In at least one example, the machine learning model outputs may include predicted channel characteristics associated with multiple subsets of output features. A first output feature subset may be associated with predicted channel characteristics regarding the first serving cell (e.g., first network entity 604-1), and a second output feature subset may be associated with predicted channel characteristics regarding the second serving cell (e.g., second network entity 604-2).

In at least one example, the model labels may include multiple subsets of labeled data. A first label subset may be associated with channel characteristics measured from channel measurement resources associated with the first serving cell and the first output feature subset, and a second label subset may be associated with channel characteristics measured from channel measurement resources associated with the second serving cell and the second output feature subset.

When facilitating beam predictions, the UE 602 may follow network configuration or dynamic indications on the machine learning model inputs and outputs to carry out the machine learning beam predictions. When facilitating model training, the UE 602 may follow network configurations or dynamic indications on model inputs, outputs, and labels to carry out the machine learning training.

Figure 9:
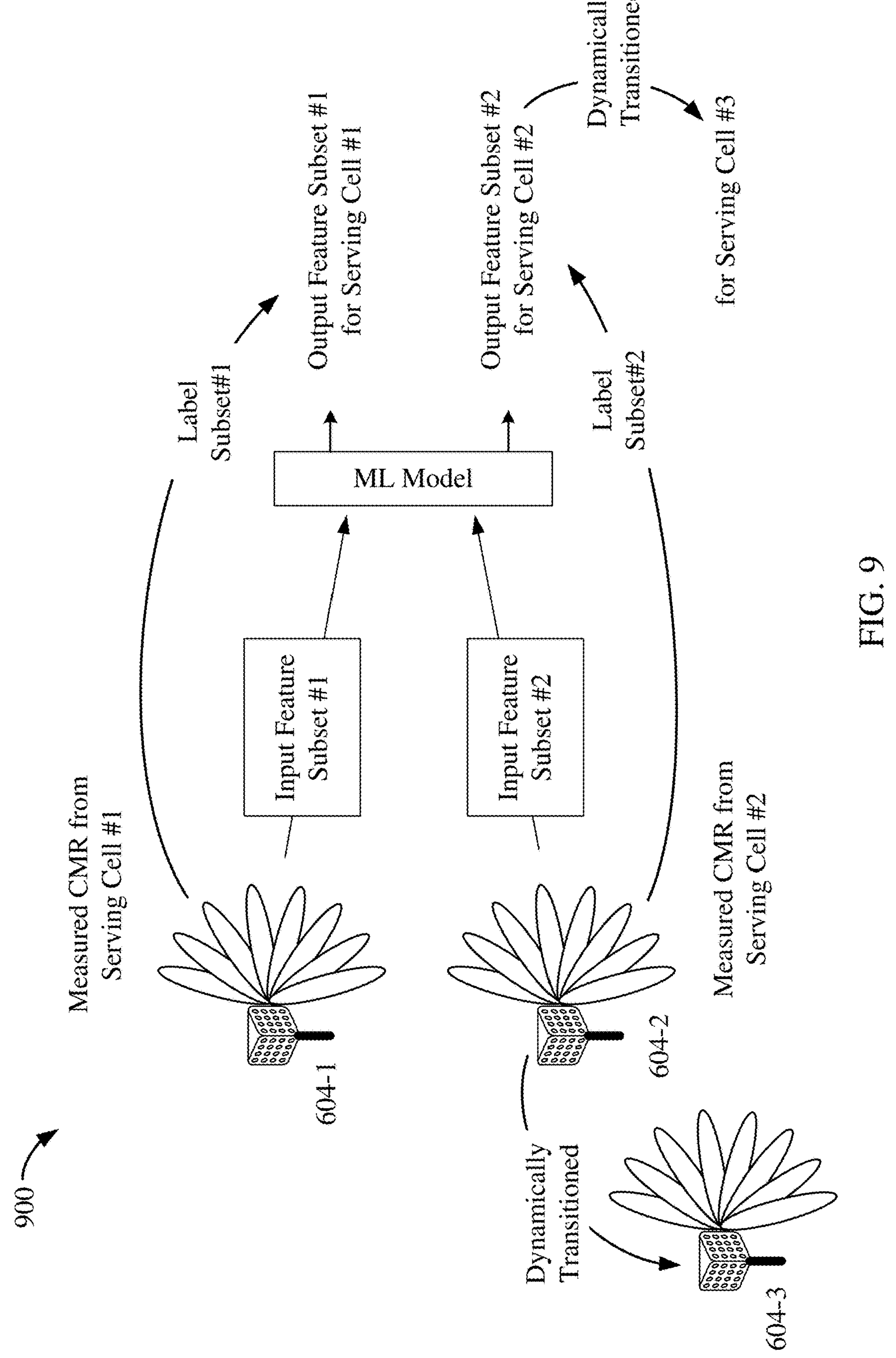
FIG. 9 is a schematic diagram illustrating an example of dynamic transitions between serving cells using a machine learning model, in according with the present disclosure.

In some examples, a UE 602 employing a machine learning model of the present disclosure may be configured to dynamically transition to a different serving cell. For example, FIG. 9 is a schematic diagram illustrating an example 900 of dynamic transitions between serving cells using a machine learning model, in according with the present disclosure. In the depicted example, the machine learning model input, output, and/or label subsets may be respectively configured to be associated with multiple CSI report and/or resource settings from different serving cells.

A MAC-CE or DCI may be used to indicate to the UE 602 to transition from previously configured or previously indicated CSI report and/or resource settings from different serving cells, to other CSI report and/or resource settings from a different serving cell. For example, the UE 602 may receive a MAC-CE or DCI indicating to transition from the second network entity 604-2 to the third network entity 604-3. The candidate serving cells and the associated CSI report and/or resource settings may be preconfigured by the machine learning model and/or training procedures, and the dynamic indication may indicate the respective identifiers of such candidates. To facilitate such examples, some implementations may employ machine learning models trained general enough such that they can be used in variously different serving cell combinations.

Figure 10:
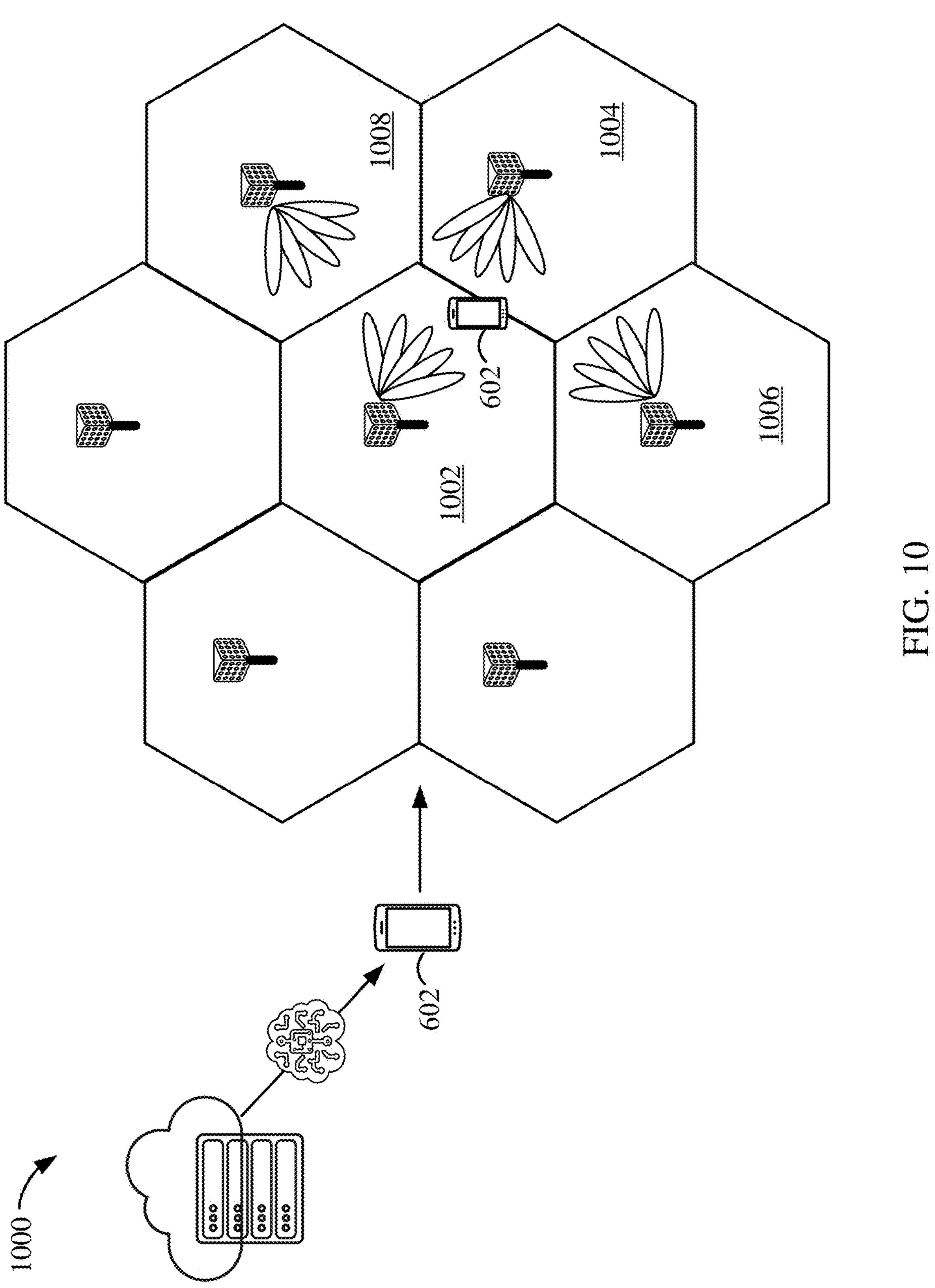
FIG. 10 is a schematic diagram illustrating an example application of dynamic transitions between serving cells using a machine learning model in L1/L2-centric mobility, in according with the present disclosure.

FIG. 10 is a schematic diagram illustrating an example application 1000 of dynamic transitions between serving cells using a machine learning model in L1/L2-centric mobility, in according with the present disclosure. In the depicted example, the machine learning model inputs from FIG. 8 may be based on L1-RSRPs measured from preconfigured or dynamically indicated SSBs from a first number of non-active serving cells. As the UE 602 moves within the area depicted, the UE 602 may move within or between one or more of the depicted cells, such as from cell 1002 toward cell 1004. In the depicted example, the active serving cell is 1002, and the UE 602 is located near the edge of the cell 1002 and cell 1004.

The machine learning model outputs may include a first output indicating whether L1-RSRP/SINR associated with a second number of non-active cells should be measured or reported. For example, the machine learning model outputs may indicate that the UE 602 should perform measurements for non-active serving cells 1004, 1006, and 1008. In at least one example, the network and/or the machine learning model may utilize information from the UE 602, such as UE 602 position information and/or uplink measurements, and a network entity or the machine learning model may indicate to the UE 602 to perform measurement for cells 1004, 1006, 1008 for inputs into the machine learning model at the UE 602 for determining whether a dynamic transition of serving cells is proper, as described above with reference to FIG. 9.

If the machine learning model or the network indicates to the UE 602 that other non-active serving cells should be measured, then the UE 602 can utilize outputs from the machine learning model to indicate which PCIs associated with the reference signal from the indicated non-active serving cells should be measured or included in the report. For example, after the UE 602 determined either from the machine learning model or from signaling from the network that it should perform measurements or report non-active serving cells 1004, 1006, and 1008, the machine learning model may indicate which PCIs should be measured or included in the report. Utilizing the PCIs measured or included, the machine learning model can further indicate to the UE 602 which RSs within the identified PCIs to measure or include in the report. As an example, the UE 602 may detect the wide beams for each of cells 1004, 1006, 1008 based on the indication from the machine learning model or a network entity, and may utilize the machine learning model to determine which sub-beams should be measured for each cell 1004, 1006, 1008. As a result, the UE 602 can utilize the machine learning model to reduce the number of sub-beams that will be measured and reported to those beams that are most relevant.

Figure 11:
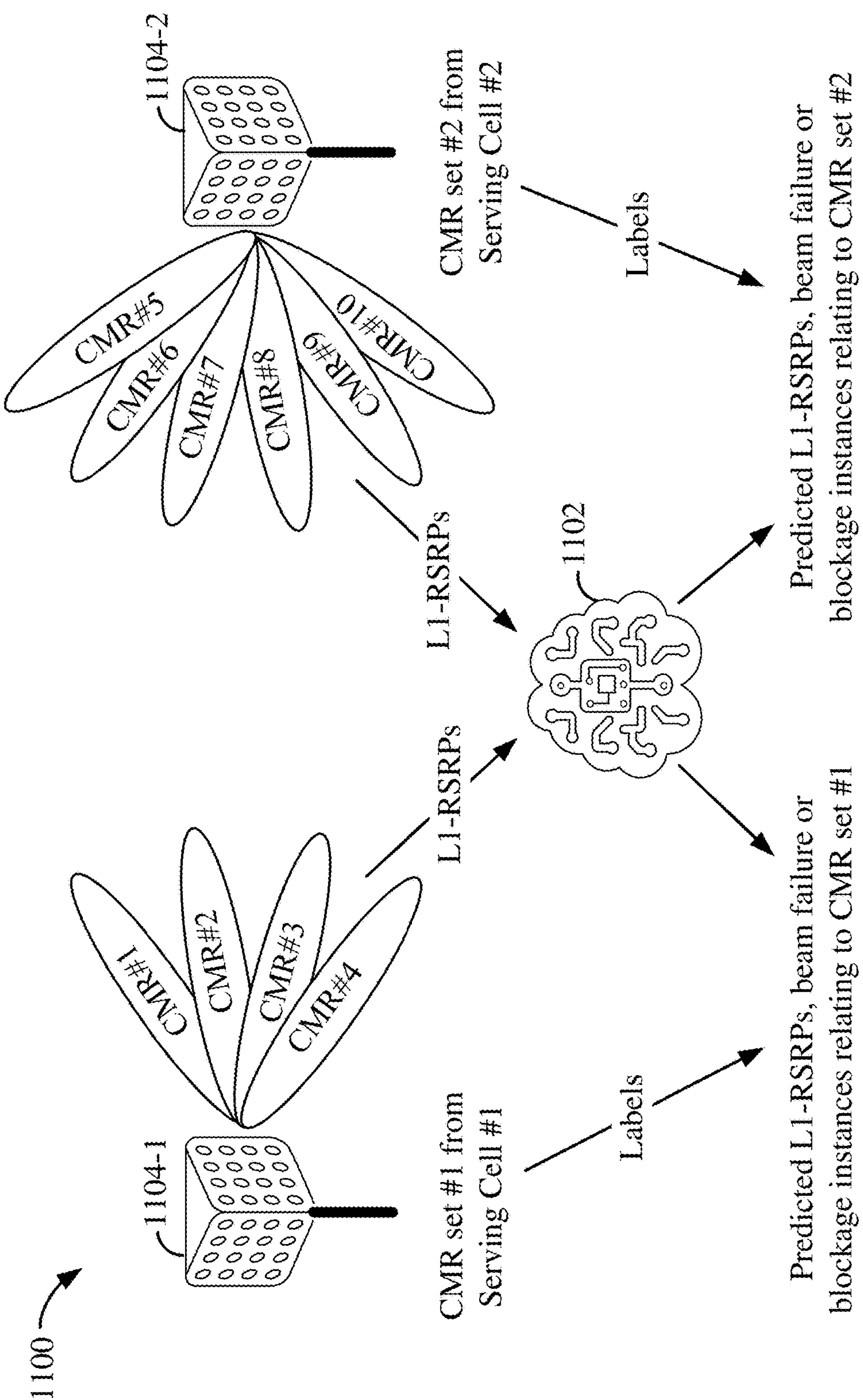
FIG. 11 is a schematic diagram illustrating an example application of dynamic transitions between serving cells using a machine learning model in cross-component-carrier multiple TRP (mTRP), in according with the present disclosure.

FIG. 11 is a schematic diagram illustrating an example application 1100 of dynamic transitions between serving cells using a machine learning model in cross-component-carrier multiple TRP (mTRP), in according with the present disclosure. The UE implementing the machine learning model 1102 may obtain L1-RSRPs measured from preconfigured or dynamically indicated channel measurement resources from multiple channel measurement resource sets associated with more than one serving cell, such as serving cells 1104-1 and 1104-2. The outputs from the machine learning model 1102 at the UE may predict future L1-RSRPs associated with the multiple channel measurement resource sets in the multiple service cells 1104-1 and 1104-2. The outputs from the machine learning model 1102 may further predict beam failure and/or beam blockage instances associated with the multiple channel measurement resource sets for each of the multiple serving cells 1104-1 and 1104-2. Additionally, the machine learning model 1102 may indicate L1-RSRPs associated with another channel measurement resource set associated with another serving cell that is different from a current serving cell.

Figure 12:
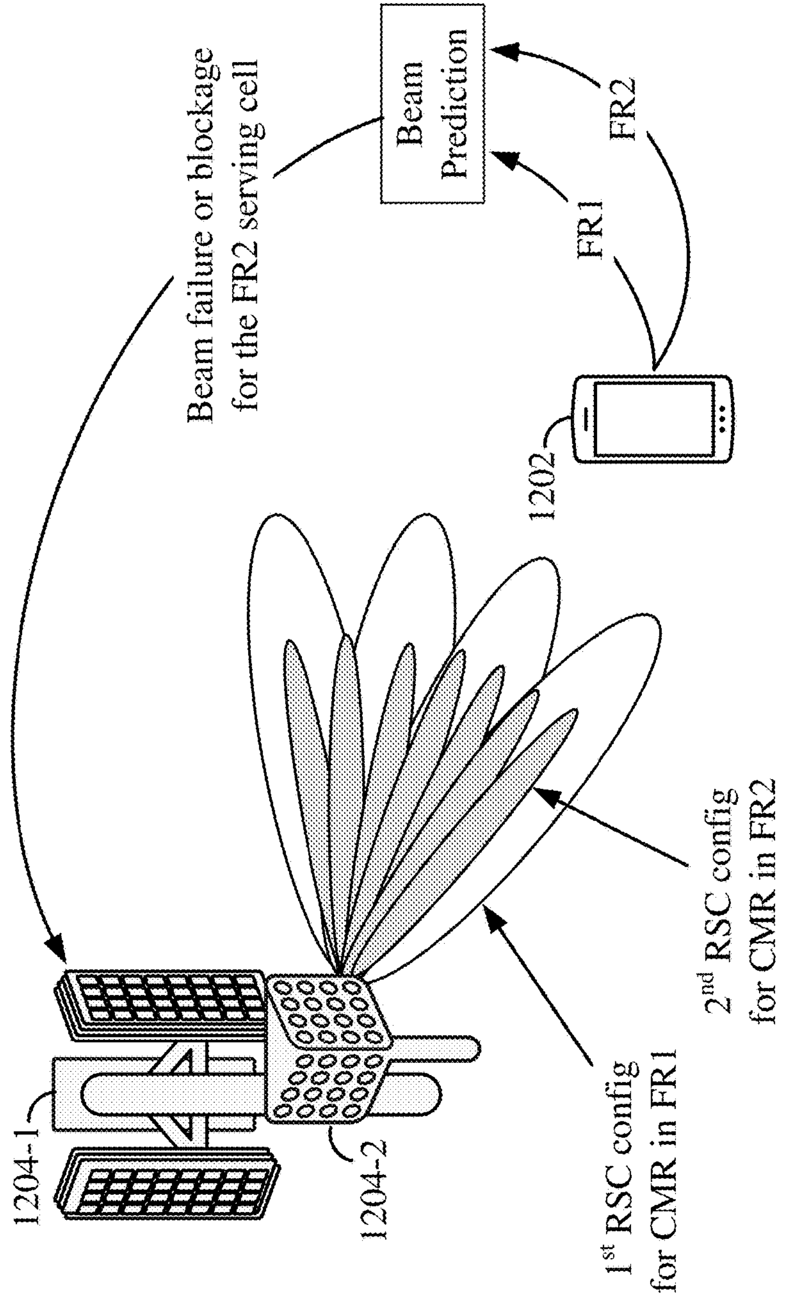
FIG. 12 is a schematic diagram illustrating an example application 1200 of dynamic transitions between serving cells using a machine learning model in cross-FR, in according with the present disclosure.

FIG. 12 is a schematic diagram illustrating an example application 1200 of dynamic transitions between serving cells using a machine learning model in cross-FR, in according with the present disclosure. The UE 1202 implementing the machine learning model may obtain measurements from preconfigured or dynamically indicated channel measurement resources from multiple channel measurement resource sets associated with more than one serving cell, such as serving cells 1204-1 and 1204-2. In the depicted example, the first serving cell 1204-1 may be configured for FR1 communications, and the second serving cell 1204-2 may be configured for FR2 communications. The outputs from the machine learning model at the UE 1202 may predict beam failure and/or beam blockage instances associated with the multiple channel measurement resource sets in FR1 for the first serving cell 1204-1 and/or in FR2 for the second serving cell 1204-2. In the depicted example, the UE 1202 is predicting a beam failure or blockage in FR2 for the second serving cell 1204-2, and can accordingly transition to the first serving cell 1204-1 and FR1.

Although the example described above includes first serving cell 1204-1 configured for FR1 communications and the second serving cell 1204-2 configured for FR2 communications, it should be understood that different frequency range designations may also be utilized. For example, both the first serving cell 1204-1 and the second serving cell 1204-2 may utilize the same frequency range designation, but in different bands. In another example, the first serving cell 1204-1 may utilizing FR2, and the second serving cell 1204-2 may utilized FR4. In yet another example, the first serving cell 1204-1 may utilizing FR1, and the second serving cell 1204-2 may utilized FR2. It should be apparent that various combinations are possible and may be implemented within concepts of the present disclosure.

Figure 13:
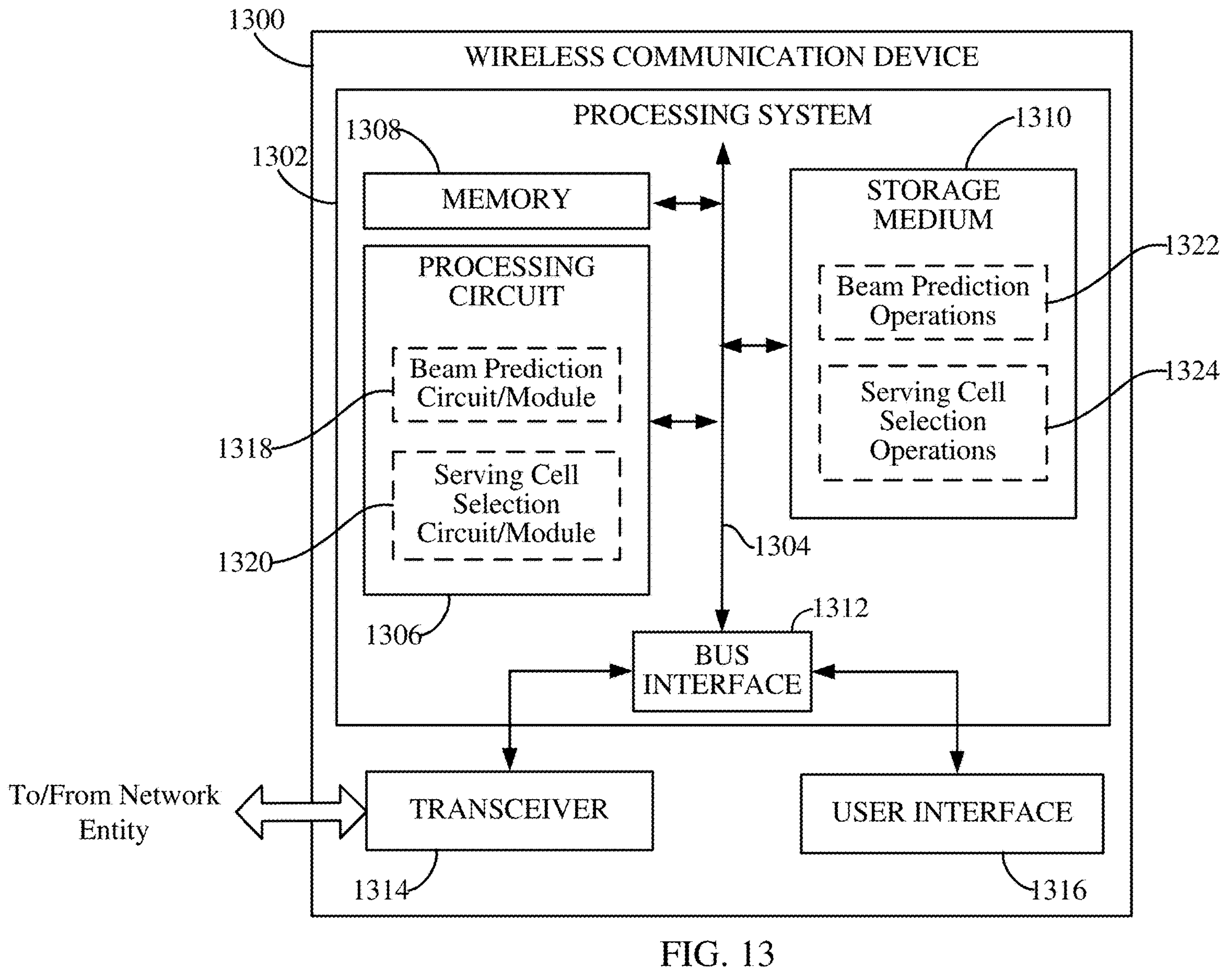
FIG. 13 is a block diagram illustrating select components of a wireless communication device according to at least one example of the present disclosure.

FIG. 13 is a block diagram illustrating select components of a wireless communication device 1300 employing a processing system 1302 according to at least one example of the present disclosure. The wireless communication device 1300 may be a UE or a scheduled entity as illustrated in any one or more of FIGS. 1, 2, 3, 5, 6, 8, 9, 10, 11, and/or 12.

In this example, the processing system 1302 is implemented with a bus architecture, represented generally by the bus 1304. The bus 1304 may include any number of interconnecting buses and bridges depending on the specific application of the processing system 1302 and the overall design constraints. The bus 1304 communicatively couples together various circuits including one or more processors (represented generally by the processing circuit 1306), a memory 1308, and computer-readable media (represented generally by the storage medium 1310). The bus 1304 may also link various other circuits such as timing sources, peripherals, voltage regulators, and power management circuits, which are well known in the art, and therefore, will not be described any further. A bus interface 1312 provides an interface between the bus 1304 and a transceiver 1314. The transceiver 1314 provides a means for communicating with various other apparatus over a transmission medium. The transceiver 1314 may also include a transmit chain to transmit one or more wireless signals via the antenna array. For example, the transceiver 1314 may include a receive chain to receive one or more wireless signals, and/or a transmit chain to transmit one or more wireless signals. Depending upon the nature of the apparatus, a user interface 1316 (e.g., keypad, display, speaker, microphone, joystick) may also be provided.

The processing circuit 1306 is responsible for managing the bus 1304 and general processing, including the execution of programming stored on the computer-readable storage medium 1310. The programming, when executed by the processing circuit 1306, causes the processing system 1302 to perform the various functions described below for any particular apparatus. The computer-readable storage medium 1310 and the memory 1308 may also be used for storing data that is manipulated by the processing circuit 1306 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1306 is arranged to obtain, process and/or send data, control data access and storage, issue commands, and control other desired operations. The processing circuit 1306 may include circuitry adapted to implement desired programming provided by appropriate media, and/or circuitry adapted to perform one or more functions described in this disclosure. For example, the processing circuit 1306 may be implemented as one or more processors, one or more controllers, and/or other structure configured to execute executable programming and/or execute specific functions. Examples of the processing circuit 1306 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1306 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1306 are for illustration and other suitable configurations within the scope of the present disclosure are also contemplated.

In some instances, the processing circuit 1306 may include a beam prediction circuit and/or module 1318 and a serving cell selection circuit and/or module 1320. The beam prediction circuit/module 1318 may generally include circuitry and/or programming (e.g., programming stored on the storage medium 1310) adapted to initiate a beam prediction for at least two serving cells based at least in part on a machine learning model. The serving cell selection circuit/module 1320 may generally include circuitry and/or programming (e.g., programming stored on the storage medium 1310) adapted to selectively transition from a first set of two or more serving cells to a second set of two or more serving cells based at least in part on the beam prediction, wherein the second set of two or more serving cells includes at least on serving cell that is not included in the first set of two or more serving cells. As used herein, reference to circuitry and/or programming may be generally referred to as logic (e.g., logic gates and/or data structure logic).

The storage medium 1310 may represent one or more computer-readable devices for storing programming, such as processor executable code or instructions (e.g., software, firmware), electronic data, databases, or other digital information. The storage medium 1310 may also be used for storing data that is manipulated by the processing circuit 1306 when executing programming. The storage medium 1310 may be any available non-transitory media that can be accessed by a general purpose or special purpose processor, including portable or fixed storage devices, optical storage devices, and various other mediums capable of storing, containing and/or carrying programming. By way of example and not limitation, the storage medium 1310 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 1310 may be coupled to the processing circuit 1306 such that the processing circuit 1306 can read information from, and write information to, the storage medium 1310. That is, the storage medium 1310 can be coupled to the processing circuit 1306 so that the storage medium 1310 is at least accessible by the processing circuit 1306, including examples where the storage medium 1310 is integral to the processing circuit 1306 and/or examples where the storage medium 1310 is separate from the processing circuit 1306 (e.g., resident in the processing system 1302, external to the processing system 1302, distributed across multiple entities).

Programming stored by the storage medium 1310, when executed by the processing circuit 1306, can cause the processing circuit 1306 to perform one or more of the various functions and/or process steps described herein. In at least some examples, the storage medium 1310 may include beam prediction operations 1322 and serving cell selection operations 1324. The beam prediction operations 1322 are generally adapted to cause the processing circuit 1306 to initiate a beam prediction for the at least two serving cells based at least in part on the machine learning model, as described herein. The serving cell selection operations 1324 are generally adapted to cause the processing circuit 1306 to selectively transition from a first set of two or more serving cells to a second set of two or more serving cells based at least in part on the beam prediction, wherein the second set of two or more serving cells includes at least on serving cell that is not included in the first set of two or more serving cells, as described herein.

Thus, according to one or more aspects of the present disclosure, the processing circuit 1306 is adapted to perform (independently or in conjunction with the storage medium 1310) any or all of the processes, functions, steps and/or routines for any or all of the UEs and/or scheduled entities described herein. As used herein, the term "adapted" in relation to the processing circuit 1306 may refer to the processing circuit 1306 being one or more of configured, employed, implemented, and/or programmed (in conjunction with the storage medium 1310) to perform a particular process, function, step and/or routine according to various features described herein.

Figure 14:
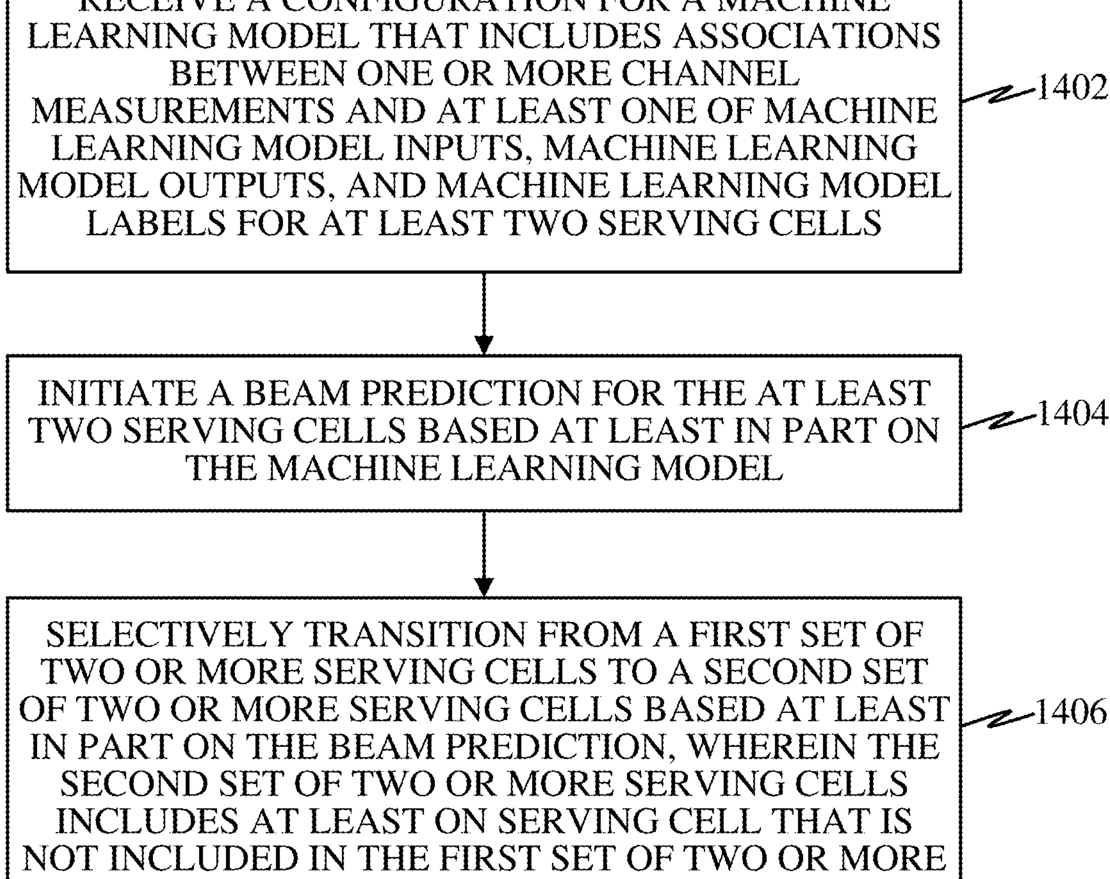
FIG. 14 is a flow diagram illustrating a wireless communication method according to some examples.

FIG. 14 is a flow diagram illustrating a wireless communication method according to some examples. A wireless communication device may receive, at step 1402, a configuration for a machine learning model that includes associations between one or more channel measurements and at least one of machine learning model inputs, machine learning model outputs, and machine learning model labels for at least two serving cells. For example, the wireless communication device 1300 may receive the configuration for the machine learning model as a wireless communication received via the transceiver 1314, or may be pre-provisioned with the configuration for the machine learning model.

At 1404, the wireless communication device may initiate a beam prediction for the at least two serving cells based at least in part on the machine learning model. For example, the processing system 1302 may include logic (e.g., beam prediction circuit/module 1318, beam prediction operations 1322) to initiate a beam prediction for the at least two serving cells based at least in part on the machine learning model.

At 1404, the wireless communication device may selectively transition from a first serving cell to a second serving cell based at least in part on the beam prediction. For example, the processing system 1302 may include logic (e.g., serving cell selection circuit/module 1320, serving cell selection operations 1324) to transition from a first serving cell to a second serving cell based at least in part on the beam prediction.

The following provides an overview of aspects of the present disclosure:

Aspect 1: A wireless communication device, comprising a transceiver, a memory, and a processor communicatively coupled to the transceiver and the memory, the processor configured to receive a configuration for a machine learning model that includes associations between one or more channel measurements and at least one of machine learning model inputs, machine learning model outputs, and machine learning model labels for at least two serving cells, and initiate a beam prediction for the at least two serving cells based at least in part on the machine learning model.

Aspect 2: The wireless communication device of aspect 1, wherein the processor is further configured to switch from employing machine learning model inputs, machine learning model outputs, and machine learning model labels for a first serving cell for beam predictions to employing machine learning model inputs, machine learning model outputs, and machine learning model labels for a second serving cell in the machine learning model for beam predictions.

Aspect 3: The wireless communication device of aspect 1 or 2, wherein the processor is further configured to receive an indication from a network entity to transition from at least one of a previously indicated channel state information (CSI) report or resource setting associated with a first set of two or more serving cells to a different CSI report and resource settings associated with a second set of two or more serving cells, wherein the second set of two or more serving cells includes at least one serving cell that is not included in the first set of two or more serving cells, and transition from the previously indicated CSI report and resource setting associated with the first set of two or more serving cells to the different CSI report and resource settings associated with the second set of two or more serving cells.

Aspect 4: The wireless communication device of any of aspects 1 through 3, wherein the received indication from the network entity comprises one of a MAC control element (MAC-CE) or downlink control information (DCI).

Aspect 5: The wireless communication device of any of aspects 1 through 4, wherein the machine learning model inputs for the machine learning model comprise multiple subsets of input features, wherein a first input feature subset is associated with channel characteristics measured from channel measurement resources associated with the first serving cell, and wherein a second input feature subset is associated with channel characteristics measured from channel measurement resources associated with the second serving cell.

Aspect 6: The wireless communication device of any of aspects 1 through 5, wherein the machine learning model outputs for the machine learning model comprise predicted channel characteristics associated with multiple subsets of output features, wherein a first output feature subset is associated with predicted channel characteristics for the first serving cell, and a second output feature subset is associated with predicted channel characteristics for the second serving cell.

Aspect 7: The wireless communication device of any of aspects 1 through 6, wherein the machine learning model labels for the machine learning model comprise multiple subsets of labeled data, wherein a first label subset is associated with channel characteristics measured from channel measurement resources associated with the first serving cell and a first output feature subset, and a second label subset is associated with channel characteristics measured from channel measurement resources associated with the second serving cell and a second output feature subset.

Aspect 8: The wireless communication device of any of aspects 1 through 7, wherein the machine learning model inputs for the machine learning model are based on L1-reference signal received power (L1-RSRP) measurements from SSBs from a first number of non-active serving cells, and the machine learning model outputs for the machine learning model indicate that measurements should be performed for a second number of non-active serving cells, which physical layer cell identities (PCI) s associated with the reference signal from the second number of non-active serving cells to measure or include in a report, and which reference signals within the indicated PCIs to measure or include in the report.

Aspect 9: The wireless communication device of any of aspects 1 through 8, wherein the machine learning model inputs for the machine learning model are based on L1-reference signal received power (L1-RSRP) measurements from channel measurement resources (CMRs) from multiple CMR sets associated with a plurality of serving cells, and wherein the processor configured to initiate a beam prediction for the at least two serving cells based at least in part on the machine learning model comprises the processor configured to predict future L1-RSRPs associated with the multiple CMR sets in the plurality of serving cells based on outputs from the machine learning model, predict beam failure or beam blockage instances associated with the multiple CMR sets for the plurality of serving cells based on outputs from the machine learning model; or predict L1-RSRPs associated with another CMR set associated with another serving cell that is different from the at least two serving cells.

Aspect 10: The wireless communication device of any of aspects 1 through 9, wherein the processor configured to initiate a beam prediction for the at least two serving cells based at least in part on the machine learning model comprises the processor configured to predict a beam failure or blockage instances for a first serving cell of the at least two serving cells utilizing a frequency range designation selected from a group of frequency range designations comprising FR1, FR2, FR3, and FR4.

Aspect 11: The wireless communication device of any of aspects 1 through 10, wherein the processor is further configured to selectively transition from the first serving cell utilizing a first frequency range designation to a second serving cell utilizing a second frequency range designation based at least in part on the prediction of a beam failure or blockage instances for the first serving cell of the at least two serving cells.

Aspect 12: The wireless communication device of any of aspects 1 through 4, wherein the processor is further configured to selectively transition from the first serving cell utilizing a first band in a first frequency range designation to a second serving cell utilizing a second band in the first frequency range designation based at least in part on the prediction of a beam failure or blockage instances for the first serving cell of the at least two serving cells.

Aspect 13: A method of wireless communication, comprising receiving a configuration for a machine learning model that includes associations between one or more channel measurements and at least one of machine learning model inputs, machine learning model outputs, and machine learning model labels for at least two serving cells, and initiating a beam prediction for the at least two serving cells based at least in part on the machine learning model.

Aspect 14: The method of aspect 13, further comprising switching from employing machine learning model inputs, machine learning model outputs, and machine learning model labels for a first serving cell for beam predictions to employing machine learning model inputs, machine learning model outputs, and machine learning model labels for a second serving cell in the machine learning model for beam predictions.

Aspect 15: The method of any of aspects 13 and 14, further comprising receiving an indication from a network entity to transition from a previously indicated channel state information (CSI) report and resource setting associated with a first set of two or more serving cells to a different CSI report and resource settings associated with a second set of two or more serving cells, wherein the second set of two or more serving cells includes at least one serving cell that is not included in the first set of two or more serving cells, and transitioning from the previously indicated CSI report and resource setting associated with the first set of two or more serving cells to the different CSI report and resource settings associated with the second set of two or more serving cells.

Aspect 16: The method of any of aspects 13 through 15, wherein receiving the indication from the network entity to transition from the previously indicated CSI report and resource setting associated with the first set of two or more serving cells to the different CSI report and resource settings associated with the second set of two or more serving cells comprises receiving an indication from the network entity comprising one of a MAC control element (MAC-CE) or downlink control information (DCI).

Aspect 17: The method of any of aspects 13 through 16, wherein the machine learning model inputs for the machine learning model comprise multiple subsets of input features, wherein a first input feature subset is associated with channel characteristics measured from channel measurement resources associated with the first serving cell, and wherein a second input feature subset is associated with channel characteristics measured from channel measurement resources associated with the second serving cell.

Aspect 18: The method of any of aspects 13 through 17, wherein the machine learning model outputs for the machine learning model comprise predicted channel characteristics associated with multiple subsets of output features, wherein a first output feature subset is associated with predicted channel characteristics for the first serving cell, and a second output feature subset is associated with predicted channel characteristics for the second serving cell.

Aspect 19: The method of any of aspects 13 through 18, wherein the machine learning model labels for the machine learning model comprise multiple subsets of labeled data, wherein a first label subset is associated with channel characteristics measured from channel measurement resources associated with the first serving cell and a first output feature subset, and a second label subset is associated with channel characteristics measured from channel measurement resources associated with the second serving cell and a second output feature subset.

Aspect 20: The method of any of aspects 13 through 19, wherein the machine learning model inputs for the machine learning model are based on L1-reference signal received power (L1-RSRP) measurements from SSBs from a first number of non-active serving cells, and the machine learning model outputs for the machine learning model indicate that measurements should be performed for a second number of non-active serving cells, which physical layer cell identities (PCI) s associated with the reference signal from the second number of non-active serving cells to measure or include in a report, and which reference signals within the indicated PCIs to measure or include in the report.

Aspect 21: The method of any of aspects 13 through 20, wherein the machine learning model inputs for the machine learning model are based on L1-reference signal received power (L1-RSRP) measurements from channel measurement resources (CMRs) from multiple CMR sets associated with a plurality of serving cells, and wherein initiating a beam prediction for the at least two serving cells based at least in part on the machine learning model comprises at least one of predicting future L1-RSRPs associated with the multiple CMR sets in the plurality of serving cells based on outputs from the machine learning model, predicting beam failure or beam blockage instances associated with the multiple CMR sets for the plurality of serving cells based on outputs from the machine learning model, or predicting L1-RSRPs associated with another CMR set associated with another serving cell that is different from the at least two serving cells.

Aspect 22: The method of any of aspects 13 through 21, wherein initiating a beam prediction for the at least two serving cells based at least in part on the machine learning model comprises predicting a beam failure or blockage instances for a first serving cell of the at least two serving cells utilizing a frequency range designation selected from a group of frequency range designations comprising frequency bands FR1, FR2, FR3, and FR4.

Aspect 23: The method of any of aspects 13 through 22, further comprising selectively transition from the first serving cell utilizing a first frequency range designation to a second serving cell utilizing a second frequency range designation based at least in part on the prediction of a beam failure or blockage instances for the first serving cell of the at least two serving cells.

Aspect 24: The method of any of aspects 13 through 23, further comprising selectively transition from the first serving cell utilizing a first band in a first frequency range designation to a second serving cell utilizing a second band in the first frequency range designation based at least in part on the prediction of a beam failure or blockage instances for the first serving cell of the at least two serving cells.

Aspect 25: An apparatus for wireless communication, comprising means for receiving a configuration for a machine learning model that includes associations between one or more channel measurements and at least one of machine learning model inputs, machine learning model outputs, and machine learning model labels for at least two serving cells, and means for initiating a beam prediction for the at least two serving cells based at least in part on the machine learning model.

Aspect 26: The apparatus of aspect 25, further comprising means for switching from employing machine learning model inputs, machine learning model outputs, and machine learning model labels for a first serving cell for beam predictions to employing machine learning model inputs, machine learning model outputs, and machine learning model labels for a second serving cell in the machine learning model for beam predictions.

Aspect 27: The apparatus of any of aspects 25 and 26, further comprising means for receiving an indication from a network entity to transition from a previously indicated channel state information (CSI) report and resource setting associated with a first set of two or more serving cells to a different CSI report and resource settings associated with a second set of two or more serving cells, wherein the second set of two or more serving cells includes at least one serving cell that is not included in the first set of two or more serving cells, and means for transitioning from the previously indicated CSI report and resource setting associated with the first set of two or more serving cells to the different CSI report and resource settings associated with the second set of two or more serving cells.

Aspect 28: The apparatus of any of aspects 25 through 28, wherein receiving the indication from the network entity to transition from the previously indicated CSI report and resource setting associated with the first set of two or more serving cells to the different CSI report and resource settings associated with the second set of two or more serving cells comprises receiving an indication from the network entity comprising one of a MAC control element (MAC-CE) or downlink control information (DCI).

Aspect 29: The apparatus of any of aspects 25 through 29, wherein the machine learning model inputs for the machine learning model comprise multiple subsets of input features, wherein a first input feature subset is associated with channel characteristics measured from channel measurement resources associated with the first serving cell, and wherein a second input feature subset is associated with channel characteristics measured from channel measurement resources associated with the second serving cell.

Aspect 30: The apparatus of any of aspects 25 through 29, wherein the machine learning model outputs for the machine learning model comprise predicted channel characteristics associated with multiple subsets of output features, wherein a first output feature subset is associated with predicted channel characteristics for the first serving cell, and a second output feature subset is associated with predicted channel characteristics for the second serving cell.

Aspect 31: The apparatus of any of aspects 25 through 30, wherein the machine learning model labels for the machine learning model comprise multiple subsets of labeled data, wherein a first label subset is associated with channel characteristics measured from channel measurement resources associated with the first serving cell and a first output feature subset, and a second label subset is associated with channel characteristics measured from channel measurement resources associated with the second serving cell and a second output feature subset.

Aspect 32: The apparatus of any of aspects 25 through 31, wherein the machine learning model inputs for the machine learning model are based on L1-reference signal received power (L1-RSRP) measurements from SSBs from a first number of non-active serving cells, and the machine learning model outputs for the machine learning model indicate that measurements should be performed for a second number of non-active serving cells, which physical layer cell identities (PCI) s associated with the reference signal from the second number of non-active serving cells to measure or include in a report, and which reference signals within the indicated PCIs to measure or include in the report.

Aspect 33: The apparatus of any of aspects 25 through 32, wherein the machine learning model inputs for the machine learning model are based on L1-reference signal received power (L1-RSRP) measurements from channel measurement resources (CMRs) from multiple CMR sets associated with a plurality of serving cells, and wherein initiating a beam prediction for the at least two serving cells based at least in part on the machine learning model comprises at least one of predicting future L1-RSRPs associated with the multiple CMR sets in the plurality of serving cells based on outputs from the machine learning model, predicting beam failure or beam blockage instances associated with the multiple CMR sets for the plurality of serving cells based on outputs from the machine learning model, or predicting L1-RSRPs associated with another CMR set associated with another serving cell that is different from the at least two serving cells.

Aspect 34: The apparatus of any of aspects 25 through 33, wherein initiating a beam prediction for the at least two serving cells based at least in part on the machine learning model comprises predicting a beam failure or blockage instances for a first serving cell of the at least two serving cells utilizing a frequency range designation selected from a group of frequency range designations comprising FR1, FR2, FR3, and FR4.

Aspect 35: The apparatus of any of aspects 25 through 34, further comprising means for selectively transitioning from at least one serving cell utilizing a first frequency range designation to at least one serving cell utilizing a second frequency range designation based at least in part on the prediction of a beam failure or blockage instances for a serving cell within the first set of two or more serving cells.

Aspect 36: The apparatus of any of aspects 25 through 35, further comprising means for selectively transitioning from the first serving cell utilizing a first band in a first frequency range designation to a second serving cell utilizing a second band in the first frequency range designation based at least in part on the prediction of a beam failure or blockage instances for the first serving cell of the at least two serving cells.

Aspect 37: A non-transitory processor-readable storage medium storing processor-executable instructions for causing a processing circuit to receive a configuration for a machine learning model that includes associations between one or more channel measurements and at least one of machine learning model inputs, machine learning model outputs, and machine learning model labels for at least two serving cells, and initiate a beam prediction for the at least two serving cells based at least in part on the machine learning model.

Aspect 38: The processor-readable storage medium of aspect 37, further comprising processor-executable instructions for causing a processing circuit to switch from employing machine learning model inputs, machine learning model outputs, and machine learning model labels for a first serving cell for beam predictions to employing machine learning model inputs, machine learning model outputs, and machine learning model labels for a second serving cell in the machine learning model for beam predictions.

Aspect 39: The processor-readable storage medium of any of aspects 37 through 38, further comprising processor-executable instructions for causing a processing circuit to receive an indication from a network entity to transition from a previously indicated channel state information (CSI) report and resource setting associated with a first set of two or more serving cells to a different CSI report and resource settings associated with a second set of two or more serving cells, wherein the second set of two or more serving cells includes at least one serving cell that is not included in the first set of two or more serving cells, and transition from the previously indicated CSI report and resource setting associated with the first set of two or more serving cells to the different CSI report and resource settings associated with the second set of two or more serving cells.

Aspect 40: The processor-readable storage medium of any of aspects 37 through 39, wherein the received indication from the network entity comprises one of a MAC control element (MAC-CE) or downlink control information (DCI).

Aspect 41: The processor-readable storage medium of any of aspects 37 through 40, wherein the machine learning model inputs for the machine learning model comprise multiple subsets of input features, wherein a first input feature subset is associated with channel characteristics measured from channel measurement resources associated with the first serving cell, and wherein a second input feature subset is associated with channel characteristics measured from channel measurement resources associated with the second serving cell.

Aspect 42: The processor-readable storage medium of any of aspects 37 through 41, wherein the machine learning model outputs for the machine learning model comprise predicted channel characteristics associated with multiple subsets of output features, wherein a first output feature subset is associated with predicted channel characteristics for the first serving cell, and a second output feature subset is associated with predicted channel characteristics for the second serving cell.

Aspect 43: The processor-readable storage medium of any of aspects 37 through 42, wherein the machine learning model labels for the machine learning model comprise multiple subsets of labeled data, wherein a first label subset is associated with channel characteristics measured from channel measurement resources associated with the first serving cell and a first output feature subset, and a second label subset is associated with channel characteristics measured from channel measurement resources associated with the second serving cell and a second output feature subset.

Aspect 44: The processor-readable storage medium of any of aspects 37 through 43, wherein the machine learning model inputs for the machine learning model are based on L1-reference signal received power (L1-RSRP) measurements from SSBs from a first number of non-active serving cells, and the machine learning model outputs for the machine learning model indicate that measurements should be performed for a second number of non-active serving cells, which physical layer cell identities (PCI) s associated with the reference signal from the second number of non-active serving cells to measure or include in a report, and which reference signals within the indicated PCIs to measure or include in the report.

Aspect 45: The processor-readable storage medium of any of aspects 37 through 44, wherein the machine learning model inputs for the machine learning model are based on L1-reference signal received power (L1-RSRP) measurements from channel measurement resources (CMRs) from multiple CMR sets associated with a plurality of serving cells, and wherein the processor-executable instructions for causing a processing circuit to initiate a beam prediction for the at least two serving cells based at least in part on the machine learning model comprises processor-executable instructions for causing a processing circuit to predict at least one of predict future L1-RSRPs associated with the multiple CMR sets in the plurality of serving cells based on outputs from the machine learning model, predict beam failure or beam blockage instances associated with the multiple CMR sets for the plurality of serving cells based on outputs from the machine learning model, or predict L1-RSRPs associated with another CMR set associated with another serving cell that is different from the at least two serving cells.

Aspect 46: The processor-readable storage medium of any of aspects 37 through 45, wherein the processor-executable instructions for causing a processing circuit to initiate a beam prediction for the at least two serving cells based at least in part on the machine learning model comprises processor-executable instructions for causing a processing circuit to predict a beam failure or blockage instances for a first serving cell of the at least two serving cells utilizing a frequency range designation selected from a group of frequency range designations comprising FR1, FR2, FR3, and FR4.

Aspect 47: The processor-readable storage medium of any of aspects 37 through 46, further comprising processor-executable instructions for causing a processing circuit to selectively transition from the first serving cell utilizing a first frequency range designation to a second serving cell utilizing a second frequency range designation based at least in part on the prediction of a beam failure or blockage instances for the first serving cell of the at least two serving cells.

Aspect 48: The processor-readable storage medium of any of aspects 37 through 47, further comprising processor-executable instructions for causing a processing circuit to selectively transition from the first serving cell utilizing a first band in a first frequency range designation to a second serving cell utilizing a second band in the first frequency range designation based at least in part on the prediction of a beam failure or blockage instances for the first serving cell of the at least two serving cells.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP or combinations of such systems. These systems may include candidates such as 5G New Radio (NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

While the above discussed aspects, arrangements, and embodiments are discussed with specific details and particularity, one or more of the components, steps, features and/or functions illustrated in FIGS. 1, 2, 3, 4, 5, 6, 7, 8, 9, 10, 11, 12, 13, and/or 14 may be rearranged and/or combined into a single component, step, feature or function or embodied in several components, steps, or functions. Additional elements, components, steps, and/or functions may also be added or not utilized without departing from the novel features of the present disclosure. The apparatus, devices and/or components illustrated in FIGS. 1, 2, 3, 5, 6, 8, 9, 10, 11, 12, and/or 13 may be configured to perform or employ one or more of the methods, features, parameters, and/or steps described herein with reference to FIGS. 4, 7, 8, 9, 10, 11, 12, and/or 14. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A wireless communication device, comprising:

a transceiver;

a memory; and a processor communicatively coupled to the transceiver and the memory, the processor configured to:

receive a configuration for a machine learning model that includes associations between one or more channel measurements and at least one of machine learning model inputs, machine learning model outputs, and machine learning model labels for at least two serving cells;

initiate a beam prediction for the at least two serving cells based at least in part on the machine learning model;

receive an indication from a network entity to transition from at least one of a previously indicated channel state information (CSI) report or resource setting associated with a first set of two or more serving cells to a different CSI report or resource setting associated with a second set of two or more serving cells, wherein the second set of two or more serving cells includes at least one serving cell that is not included in the first set of two or more serving cells; and transition from the previously indicated CSI report or resource setting associated with the first set of two or more serving cells to the different CSI report or resource setting associated with the second set of two or more serving cells.

2. The wireless communication device of claim 1, wherein the processor is further configured to:

switch from employing machine learning model inputs, machine learning model outputs, and machine learning model labels for a first serving cell for beam predictions to employing machine learning model inputs, machine learning model outputs, and machine learning model labels for a second serving cell in the machine learning model for beam predictions.

3. The wireless communication device of claim 1, wherein the machine learning model inputs for the machine learning model comprise multiple subsets of input features, wherein a first input feature subset is associated with channel characteristics measured from channel measurement resources associated with a first serving cell, and wherein a second input feature subset is associated with channel characteristics measured from channel measurement resources associated with a second serving cell.

4. The wireless communication device of claim 1, wherein the machine learning model outputs for the machine learning model comprise predicted channel characteristics associated with multiple subsets of output features, wherein a first output feature subset is associated with predicted channel characteristics for a first serving cell, and a second output feature subset is associated with predicted channel characteristics for a second serving cell.

5. The wireless communication device of claim 1, wherein the machine learning model labels for the machine learning model comprise multiple subsets of labeled data, wherein a first label subset is associated with channel characteristics measured from channel measurement resources associated with a first serving cell and a first output feature subset, and a second label subset is associated with channel characteristics measured from channel measurement resources associated with a second serving cell and a second output feature subset.

6. The wireless communication device of claim 1, wherein the processor configured to initiate a beam prediction for the at least two serving cells based at least in part on the machine learning model comprises the processor configured to:

predict a beam failure or blockage instances for a first serving cell of the at least two serving cells utilizing a frequency range designation selected from a group of frequency range designations comprising frequency bands FR1, FR2, FR3, and FR4.

7. A method of wireless communication, comprising:

receiving a configuration for a machine learning model that includes associations between one or more channel measurements and at least one of machine learning model inputs, machine learning model outputs, and machine learning model labels for at least two serving cells;

initiating a beam prediction for the at least two serving cells based at least in part on the machine learning model;

receiving an indication from a network entity to transition from at least one of a previously indicated channel state information (CSI) report or resource setting associated with a first set of two or more serving cells to a different CSI report or resource setting associated with a second set of two or more serving cells, wherein the second set of two or more serving cells includes at least one serving cell that is not included in the first set of two or more serving cells; and transitioning from the previously indicated CSI report or resource setting associated with the first set of two or more serving cells to the different CSI report or resource setting associated with the second set of two or more serving cells.

8. The method of claim 7, further comprising:

switching from employing machine learning model inputs, machine learning model outputs, and machine learning model labels for a first serving cell for beam predictions to employing machine learning model inputs, machine learning model outputs, and machine learning model labels for a second serving cell in the machine learning model for beam predictions.

9. The method of claim 7, wherein the machine learning model inputs for the machine learning model comprise multiple subsets of input features, wherein a first input feature subset is associated with channel characteristics measured from channel measurement resources associated with a first serving cell, and wherein a second input feature subset is associated with channel characteristics measured from channel measurement resources associated with a second serving cell.

10. The method of claim 7, wherein the machine learning model outputs for the machine learning model comprise predicted channel characteristics associated with multiple subsets of output features, wherein a first output feature subset is associated with predicted channel characteristics for a first serving cell, and a second output feature subset is associated with predicted channel characteristics for a second serving cell.

11. The method of claim 7, wherein the machine learning model labels for the machine learning model comprise multiple subsets of labeled data, wherein a first label subset is associated with channel characteristics measured from channel measurement resources associated with a first serving cell and a first output feature subset, and a second label subset is associated with channel characteristics measured from channel measurement resources associated with a second serving cell and a second output feature subset.

12. The method of claim 7, wherein initiating a beam prediction for the at least two serving cells based at least in part on the machine learning model comprises:

predicting a beam failure or blockage instances for a first serving cell of the at least two serving cells utilizing a frequency range designation selected from a group of frequency range designations comprising FR1, FR2, FR3, and FR4.

13. A non-transitory processor-readable storage medium storing processor-executable instructions for causing a processing circuit to:

receive a configuration for a machine learning model that includes associations between one or more channel measurements and at least one of machine learning model inputs, machine learning model outputs, and machine learning model labels for at least two serving cells;

initiate a beam prediction for the at least two serving cells based at least in part on the machine learning model;

receive an indication from a network entity to transition from at least one of a previously indicated channel state information (CSI) report or resource setting associated with a first set of two or more serving cells to a different CSI report or resource setting associated with a second set of two or more serving cells, wherein the second set of two or more serving cells includes at least one serving cell that is not included in the first set of two or more serving cells; and transition from the previously indicated CSI report or resource setting associated with the first set of two or more serving cells to the different CSI report or resource setting associated with the second set of two or more serving cells.

14. The processor-readable storage medium of claim 13, further comprising processor-executable instructions for causing a processing circuit to:

switch from employing machine learning model inputs, machine learning model outputs, and machine learning model labels for a first serving cell for beam predictions to employing machine learning model inputs, machine learning model outputs, and machine learning model labels for a second serving cell in the machine learning model for beam predictions.

15. The processor-readable storage medium of claim 13, wherein the machine learning model inputs for the machine learning model comprise multiple subsets of input features, wherein a first input feature subset is associated with channel characteristics measured from channel measurement resources associated with a first serving cell, and wherein a second input feature subset is associated with channel characteristics measured from channel measurement resources associated with a second serving cell.

16. The processor-readable storage medium of claim 13, wherein the machine learning model outputs for the machine learning model comprise predicted channel characteristics associated with multiple subsets of output features, wherein a first output feature subset is associated with predicted channel characteristics for a first serving cell, and a second output feature subset is associated with predicted channel characteristics for a second serving cell.

17. The processor-readable storage medium of claim 13, wherein the machine learning model labels for the machine learning model comprise multiple subsets of labeled data, wherein a first label subset is associated with channel characteristics measured from channel measurement resources associated with a first serving cell and a first output feature subset, and a second label subset is associated with channel characteristics measured from channel measurement resources associated with a second serving cell and a second output feature subset.

* * * * *